United States Patent
Rylskyi Rylovnikov et al.

(10) Patent No.: US 10,728,485 B2
(45) Date of Patent: Jul. 28, 2020

(54) MULTI-MODE INPUT CONTROL UNIT WITH INFRARED AND LASER CAPABILITY

(71) Applicant: DISH UKRAINE L.L.C., Kharkov (UA)

(72) Inventors: Igor Rylskyi Rylovnikov, Kharkov (UA); Andrey Maznev, Kharkov (UA)

(73) Assignee: DISH Ukraine L.L.C., Kharkov (UA)

(*) Notice: Subject to any disclaimer, the term of this patent is extended or adjusted under 35 U.S.C. 154(b) by 169 days.

(21) Appl. No.: 15/535,550

(22) PCT Filed: Dec. 25, 2014

(86) PCT No.: PCT/UA2014/000136
§ 371 (c)(1),
(2) Date: Jun. 13, 2017

(87) PCT Pub. No.: WO2016/105321
PCT Pub. Date: Jun. 30, 2016

(65) Prior Publication Data
US 2017/0347053 A1    Nov. 30, 2017

(51) Int. Cl.
*H04N 5/44* (2011.01)
*G06F 3/0488* (2013.01)
(Continued)

(52) U.S. Cl.
CPC .......... *H04N 5/4403* (2013.01); *G02B 27/20* (2013.01); *G06F 3/038* (2013.01);
(Continued)

(58) Field of Classification Search
CPC .......... H04N 5/4403; H04N 21/42224; H04N 21/42222; H04N 2005/443;
(Continued)

(56) References Cited

U.S. PATENT DOCUMENTS

| 6,535,198 B1 * | 3/2003 | Fan | G08C 23/04 345/158 |
| 7,710,504 B2 * | 5/2010 | Lowe | G06F 3/0386 348/569 |

(Continued)

FOREIGN PATENT DOCUMENTS

| WO | 2011/062716 A1 | 5/2011 | |
| WO | WO 2011/062716 * | 5/2011 | ............. G06F 3/048 |
| WO | 2016/105321 A1 | 6/2016 | |

OTHER PUBLICATIONS

Olsen et. al. "Laser Pointer Interaction" Mar. 31, 2001. CHI conference proceedings, pp. 17-22. (Year: 2001).*

(Continued)

*Primary Examiner* — Andrew Sasinowski
(74) *Attorney, Agent, or Firm* — Kilpatrick Townsend & Stockton LLP

(57) ABSTRACT

A multi-mode remote control unit that has both infrared command and laser pointer capability. In some examples, the multi-mode remote control unit together with one or both of a television receiver and a television may implement simulated touch gestures that typically require a touch sensitive screen. The multi-mode remote control unit in such an implementation advantageously may not include logic to implement simulated multi-touch gestures. Rather, one or both of the television receiver and the television may include logic to implement simulated touch gestures.

20 Claims, 12 Drawing Sheets

(51) Int. Cl.
*G06F 3/038* (2013.01)
*H04N 21/422* (2011.01)
*G06F 3/0485* (2013.01)
*G06F 3/0354* (2013.01)
*G02B 27/20* (2006.01)

(52) U.S. Cl.
CPC ........ *G06F 3/03547* (2013.01); *G06F 3/0485* (2013.01); *G06F 3/04883* (2013.01); *H04N 21/42222* (2013.01); *H04N 21/42224* (2013.01); *H04N 2005/443* (2013.01); *H04N 2005/4412* (2013.01)

(58) Field of Classification Search
CPC .......... H04N 2005/4412; G06F 3/0485; G06F 3/038; G06F 3/03547; G06F 3/04883; G02B 27/20
See application file for complete search history.

(56) References Cited

U.S. PATENT DOCUMENTS

2006/0238493 A1\* 10/2006 Dunton ................ G06F 3/0386
345/156
2014/0055355 A1 2/2014 Song

OTHER PUBLICATIONS

Buntarou, et al., "Laser pointer interaction techniques using peripheral areas of screens", Proceedings of the Working Conference on Advanced Visual Interfaces, AVI '06, Jan. 1, 2006, XP055022421, New York, New York, USA DOI: 10.1145/1133265.1133284, ISBN: 978-1-59593353-9.

Olsen, et al., "Laser Pointer Interaction" Proceedings of CHI 2001 Mar. 31-Apr. 5, 2001 Seattle, WA, USA; [CHI Conference Proceedings. Human Factors in Computing Systems], CHI 2001 Conference Proceedings. Conference on Human Factors in Computing Systems ACM New York, NY, USA. Mar. 31, 2001, pp. 17-22, XP001090363, DOI: 10.1145/365024.365030, ISBN: 978-1-58113-327-1.

International Search Report and Written Opinion for PCT/UA2014/000136 dated Jul. 6, 2015, all pages.

\* cited by examiner

MULTI-MODE INPUT CONTROL UNIT WITH INFRARED AND LASER CAPABILITY

CROSS-REFERENCE TO RELATED APPLICATIONS

This application is a U.S. National Stage of PCT International Application No. PCT/UA2014/000136, filed on Dec. 25, 2014, entitled "Multi-Mode Input Control Unit With Infrared And Laser Capability," which is hereby incorporated by reference in its entirety.

BACKGROUND

The advent of the digital video recorder, multi-tuner television receiver, and the availability of high-capacity and affordable computer-readable storage devices have made available many possibilities to television programming service providers and viewers alike. In addition, viewers have come to expect flexibility and convenience with respect to the accessing of content via their television receivers.

SUMMARY

In an aspect, a method may include or comprise: receiving, by a computing device, an indication of intent of selection of a user interface control based upon impingement of a laser beam, that is generated by a remote control device, at a particular point on a screen of a presentation device; receiving, by the computing device, a command to engage the user interface control based upon an infrared signal generated by the remote control device; and selecting, by the computing device, a particular user interface for display by the presentation device based upon the impingement of the laser beam at the particular point on the screen of the presentation device and the command to engage the user interface control.

In an aspect, a television receiver may include or comprise: a processor; and a memory communicatively coupled with and readable by the processor and having stored processor-readable instructions that, when executed by the processor, cause the processor to: receive an indication of intent of selection of a user interface control based upon impingement of a laser beam, that is generated by a remote control device, at a particular point on a screen of a presentation device; receive a command to activate the user interface control based upon an infrared signal generated by the remote control device; and select a particular user interface for display by the presentation device based upon the impingement of the laser beam at the particular point on the screen of the presentation device and the command to activate the user interface control.

In an aspect, a computer-implemented method may include or comprise: receiving, by a computing device, an indication of intent of selection of a user interface control based upon impingement of a laser beam, that is generated by a remote control device, at a particular point on a screen of a presentation device; receiving, by the computing device, a command to engage the user interface control based upon an infrared signal generated by the remote control device; selecting, by the computing device, a particular user interface for display by the presentation device based upon the impingement of the laser beam at the particular point on the screen of the presentation device and the command to engage the user interface control; outputting the particular user interface for display by the presentation device; detecting particular movement of the laser beam across the screen as the laser beam impinges the screen; and controlling display of the particular user interface based on the particular movement of the laser beam across the screen.

Other aspects are possible.

DETAILED DESCRIPTION

Figure 1:
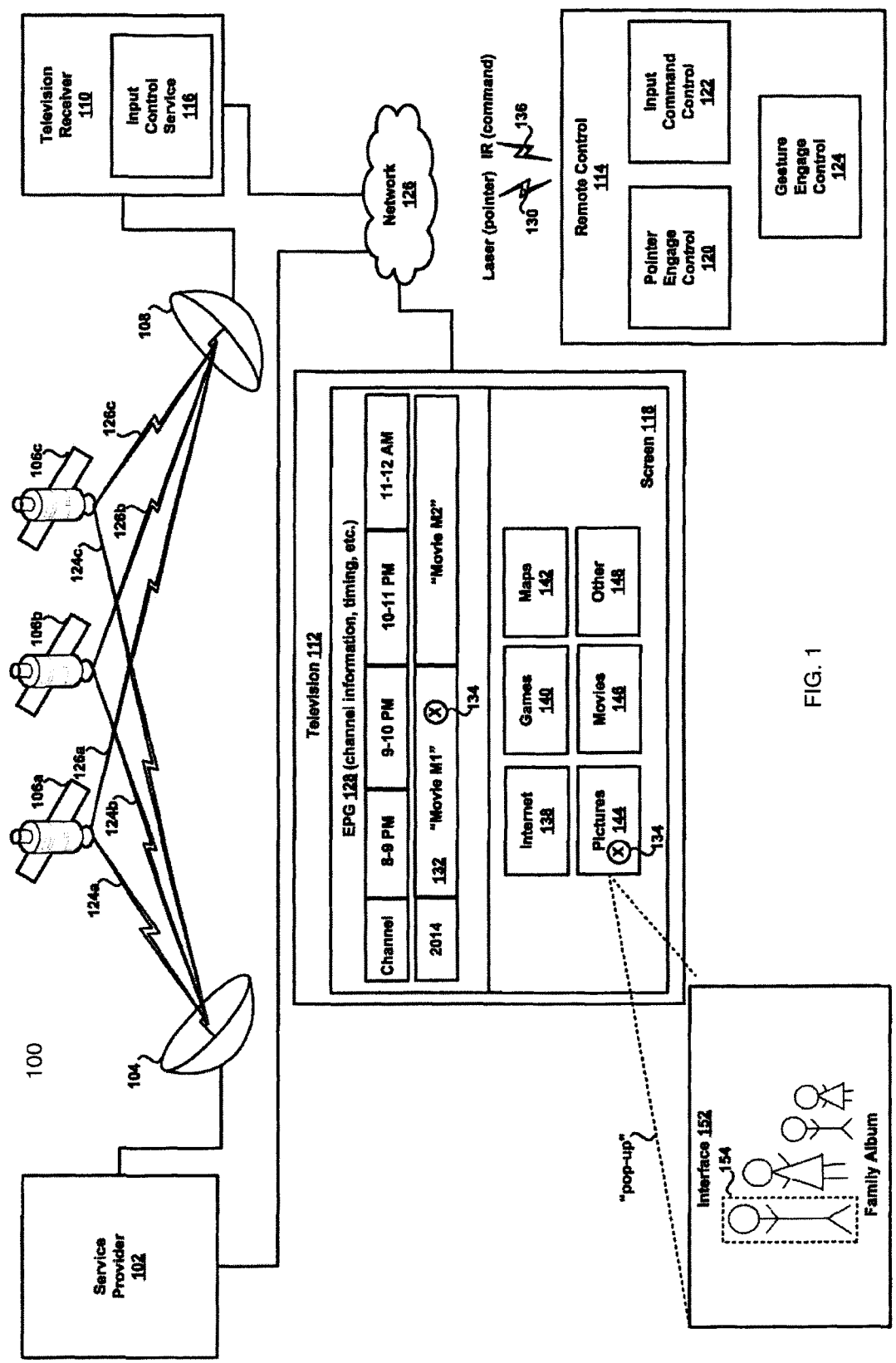
FIG. 1 shows a first example content distribution system.

FIG. 1 shows a first example satellite television distribution system 100 in which aspects of the present disclosure may be implemented. For brevity, the system 100 is depicted in a simplified form, and may include more or fewer systems, devices, networks, and/or other components as desired. Further, number and type of features or elements incorporated within the system 100 may or may not be implementation-specific, and at least some of the aspects of the system 100 may be similar to a cable television distribution system, an IPTV (Internet Protocol Television) distribution system, and/or any other type of content distribution system as desired.

The system 100 may include a service provider 102, a satellite uplink 104, a plurality of orbiting satellites 106a-c, a satellite dish 108, a television receiver 110, a television 112, and a pointing device 114. The television receiver 110 may at least include or exhibit an ICS (Input Control Service) module 116, the television 112 may at least include or exhibit a screen or screen cover 118 that serves as a sensor (e.g., a laser sensitivity sensor that comprises of an anti-reflective transparent film or coating on the surface of a screen of the television 112), and the pointing device 114 may at least include a first control 120, a second control 122, and a third control 124. The first control 120, second control 122, and third control 124, may include or comprise any one or combination of hardware, software, firmware.

Additionally, as discussed in further detail below, the ICS module 116 together with the screen 118 may enable a user to navigate, using the pointing device 114, various interfaces as output for display by the television receiver 110 to the television 112. Other examples or implementations are however possible. For instance, the ICS module 116 may be incorporated into the television 112 itself. In this example, the television receiver 110 may be omitted. An example of such an implementation is discussed in further detail below in connection with FIG. 9. Still many other examples are possible as well.

The system 100 may further include at least one network 126 that establishes a bi-directional communication path for data transfer between and among each respective element of the system 100, outside or separate from the unidirectional satellite signaling path. The network 126 is intended to represent any number of terrestrial and/or non-terrestrial network features or elements. For example, the network 126 may incorporate or exhibit any number of features or elements of various wireless and/or hardwired packet-based communication networks such as, for example, a WAN (Wide Area Network) network, a HAN (Home Area Network) network, a LAN (Local Area Network) network, a WLAN (Wireless Local Area Network) network, the Internet, a cellular communications network, or any other type of communication network configured such that data may be transferred between and among respective elements of the system 100.

The television receiver 110 as discussed throughout may generally be any type of television receiver, television converter, etc., such as a STB (Set-Top-Box) for example. Further, the television receiver 110 may exhibit functionality integrated as part of or into a television, a DVR (Digital Video Recorder), a computer such as a tablet computing device, or any other computing system or device, as well as variations thereof. For instance, in some examples, Further, the television receiver 110 and the network 126 may each be incorporated within or form at least a portion of a particular home computing network. Still further, the television receiver 110 may be configured so as to enable communications in accordance with any particular communication protocol(s) and/or standard(s) including, for example, TCP/IP (Transmission Control Protocol/Internet Protocol), DLNA/DTCP-IP (Digital Living Network Alliance/Digital Transmission Copy Protection over Internet Protocol), HDMI/CEC (High-Definition Multimedia Interface/High-bandwidth Digital Content Protection), etc. Other examples are possible. For example, one or more of the various elements or components of the example system 100 may be configured to communicate in accordance with the MoCA® (Multimedia over Coax Alliance) home networking standard.

In practice, the satellites 106a-c may each be configured to receive uplink signals 124a-c from the satellite uplink 104. In this example, each the uplink signals 124a-c may contain one or more transponder streams of particular data or content, such as one or more particular television channels, as supplied by the service provider 102. For example, each of the respective uplink signals 124a-c may contain various media or media content such as encoded HD (High Definition) television channels, SD (Standard Definition) television channels, on-demand programming, programming information, and/or any other content in the form of at least one transponder stream, and in accordance with an allotted carrier frequency and bandwidth. In this example, different media content may be carried using different ones of the satellites 106a-c.

Further, different media content may be carried using different transponders of a particular satellite (e.g., satellite 106a); thus, such media content may be transmitted at different frequencies and/or different frequency ranges. For example, a first and second television channel may be carried on a first carrier frequency over a first transponder of satellite 106a, and a third, fourth, and fifth television channel may be carried on second carrier frequency over a first transponder of satellite 106b, or, the third, fourth, and fifth television channel may be carried on a second carrier frequency over a second transponder of satellite 106a, and etc. Each of these television channels may be scrambled such that unauthorized persons are prevented from accessing the television channels.

The satellites 106a-c may further be configured to relay the uplink signals 124a-c to the satellite dish 108 as downlink signals 126a-c. Similar to the uplink signals 124a-c, each of the downlink signals 126a-c may contain one or more transponder streams of particular data or content, such as various encoded and/or at least partially electronically scrambled television channels, on-demand programming, etc., in accordance with an allotted carrier frequency and bandwidth. The downlink signals 126a-c, however, may not necessarily contain the same or similar content as a corresponding one of the uplink signals 124a-c. For example, the uplink signal 124a may include a first transponder stream containing at least a first group or grouping of television channels, and the downlink signal 126a may include a second transponder stream containing at least a second, different group or grouping of television channels. In other examples, the first and second group of television channels may have one or more television channels in common. In sum, there may be varying degrees of correlation between the uplink signals 124a-c and the downlink signals 126a-c, both in terms of content and underlying characteristics.

Further, satellite television signals may be different from broadcast television or other types of signals. Satellite signals may include multiplexed, packetized, and modulated digital signals. Once multiplexed, packetized and modulated, one analog satellite transmission may carry digital data representing several television stations or service providers. Some examples of service providers include HBO®, CBS®, ESPN®, and etc. Further, the term "channel," may in some contexts carry a different meaning from or than its normal plain language meaning. For example, the term "channel" may denote a particular carrier frequency or sub-band which can be tuned to by a particular tuner of a television receiver. In other contexts though, the term "channel" may refer to a single program/content service such as HBO®.

Additionally, a single satellite may typically have multiple transponders (e.g., 32 transponders) each one broadcasting a channel or frequency band of about 24-27 MHz in a broader frequency or polarity band of about 500 MHz. Thus, a frequency band of about 500 MHz may contain numerous sub-bands or channels of about 24-27 MHz, and each channel in turn may carry a combined stream of digital data comprising a number of content services. For example, a particular hypothetical transponder may carry HBO®, CBS®, ESPN®, plus several other channels, while another particular hypothetical transponder may itself carry 3, 4, 5, 6, etc., different channels depending on the bandwidth of the particular transponder and the amount of that bandwidth occupied by any particular channel or service on that transponder stream. Further, in many instances a single satellite may broadcast two orthogonal polarity bands of about 500 MHz. For example, a first polarity band of about 500 MHz broadcast by a particular satellite may be left-hand circular polarized, and a second polarity band of about 500 MHz may be right-hand circular polarized.

Continuing with the example scenario, the satellite dish 108 may be provided for use to receive television channels provided by the service provider 102 (e.g., on a subscription basis), satellite uplink 104, and/or satellites 106a-c. For example, the satellite dish 108 may be configured to receive particular transponder streams, or downlink signals 126a-c, from one or more of the satellites 106a-c. Based on the characteristics of the television receiver 110 and/or satellite dish 108, however, it may only be possible to capture transponder streams from a limited number of transponders concurrently. For example, a particular tuner of the television receiver 110 may be configured to tune to a single transponder stream from a transponder of a single satellite at a time.

Additionally, the television receiver 110, which is communicatively coupled to the satellite dish 108, may subsequently select via tuner, decode, and relay particular transponder streams to the television 112 for display thereon. For example, the satellite dish 108 and the television receiver 110 may, respectively, be configured to receive, decode, and relay at least one premium HD-formatted television channel to the television 112. Programming or content associated with the HD channel may generally be presented live, or from a recording as previously stored on, by, or at the television receiver 110. Here, the HD channel may be output to the television 112 in accordance with the HDMI/HDCP content protection technologies. Other examples are however possible.

Detail in terms of configuration of the television receiver 110 is described below in connection with FIG. 6. In general though, the television receiver 110 may be configured to output a plurality of interfaces to the television 112. For example, as shown in FIG. 1, the television receiver 110 may be configured to output an EPG (Electronic Programming Guide) 128 to the television 112 for display thereon. The EPG 128 may at least present various information related to television channels and the timing of programs or programming appearing on such television channels. For example, the EPG 128 may at least display channel information associated with a channel 2014, where a Movie M1 is listed as scheduled to appear on the channel 2014 during a particular time period 8-10 PM of a particular day, and etc.

In this example, and assuming that a current or instant time is sometime during the particular time period 8-10 PM, it is contemplated that a user may engage or depress the first control 120 of the pointing device 114 to activate a laser 130, that in turn is output by the pointing device 114. The user may then point the laser 130 to the television 112 so that the laser 130 impinges upon the screen 118 of the television 112, at particular location that coincides with a cell or control 132 associated with the Movie M1. Here, and as discussed in further detail below, it is contemplated that coordinates (e.g., x-y pair) of the laser 130 as it impinges upon the screen 118 may be calculated by the television 112 according to sensor data detected by the television 112, and then the television 112 may transfer the same to the ICS module 116 so that the television receiver 110 may determine (and implement next steps) that the laser 130 impinges upon the screen 118 at the particular location that coincides with the control 132. Many other examples or implementations are possible. For instance, the television 112 itself may include or comprise an instance of the ICS module 116, realized as one or a combination of hardware, software, firmware, and so it is contemplated the television receiver 110 aside from supplying typical or conventional data, media content, etc., may not implement, may implement partially, or may implement wholly, the features or aspects of the present disclosure.

Next, to select the Movie M1 for immediate viewing on the television 112, the user may engage the second control 122 of the pointing device 114 to activate an infrared command (e.g., "select") signal 136. Similar to the laser 130, the signal 136 is output by the pointing device 114, but in this instance is detected by the ICS module 116 of the television receiver 110. In this manner, the laser 130 generated by the pointing device 114 may initially be utilized to highlight or place in-focus a particular control element (e.g., control 132) as displayed on the screen 118, based upon engagement of the first control 120, and then the signal 136 generated by the pointing device 114 may be utilized to select the particular control element, based upon an engagement of the second control 122. The present disclosure however is not so limited, as discussed in further detail below in connection with at least FIG. 9. However, other aspects are contemplated as well.

For example, it is contemplated that the ICS module 116 together with the particular screen 118 may enable a user to simulate a multi-touch input or gesture using the pointing device 114. In general, multi-touch input or gesturing may refer to the ability of an electronic device to detect and perform a specific function based on input made by two or more points of contact with a touch-sensitive surface. An example of a multi-touch input includes a "pinch-to-zoom" gesture, where two fingers may be placed on a touch surface to zoom in/out of a particular screen image (e.g., photo, web page, etc.) by a pinching/spreading motion. Multi-touch gesturing is however typically unavailable in scenarios where a particular device does not include or incorporate a touch sensitive surface.

Here, it is contemplated that the ICS module 116 together with the screen 118 may enable, in addition to selecting control elements as discussed above, a user to implement or simulate a touch or multi-touch input using the pointing device 114, without the requirement of the television 112 having a touch-sensitive surface. The touch or multi-touch input is "simulated" because an associated function, such as pinch-to-zoom, "appears" or looks the same or similar on-screen as would be implemented in a conventional pinch-to-zoom operation. Advantageously, and as may be understood from the following discussion, the pointing device 114 itself does not derive or determine an intended multi-touch input. This may in some instances be preferred over other implementations in which the pointing device 114 itself does derive or determine an intended multi-touch input.

For example, by shifting such intelligence to a device or component other than the pointing device 114, the pointing device 114 itself may not necessarily require additional parts or hardware, software, firmware, etc., so that the pointing device in such an implementation may be less expensive and/or easier to manufacture in comparison to other implementations in which the pointing device 114 itself does derive or determine an intended multi-touch input. Rather, this is performed by the television 112 solely or together with the television receiver 110, by virtue of detecting displacement data that describes movement of the laser 130 across the screen 118, and then modifying an output display in accordance with that displacement data. The user may thus experience a more convenient, sophisticated, complete, and/or satisfying interaction with the any particular user interface as output by the television receiver 110 for display by the television 112. Additionally, cost of user adoption, in terms of financial investment for example, may be substantially decreased.

For example, as shown in FIG. 1, the television receiver 110 may further be configured and/or arranged to output a plurality of application icons to the television 112 for display thereon. In general, number and type of application icons output by the television receiver 110 to the television 112 may vary, and may or may not be implementation-specific. As shown in FIG. 1, however, the television receiver 110 may be configured to output at least an Internet icon 138, a Games icon 140, a Maps icon 142, a Pictures icon 144, a Movies icon 146, and an Other icon 148. In this example, the Other icon 148 is intended to represent "other" types of application icons not expressly shown in FIG. 1.

In general, a particular application icon when selected may open a corresponding application, or a folder containing corresponding application data, for interaction and/or viewing by a user via the television 112. For example, a user may manipulate the pointing device 114 to select, in a manner similar to that discussed above, the Pictures icon 144 for immediate viewing of a "Family Album" via an interface 152 on the television 112. In particular, the user may wish to interact with various images within the "Family Album" as displayed on, within, or by the interface 152. For example, as shown in FIG. 1, a user may wish to zoom-in to an area 154 within the interface 152 using the pointing device 114.

In practice, this interaction may typically entail one or more discrete "point and click" actions consistent with a "single-point" input response mode such as, for example, selection of a particular button or command to zoom-in to the area 154. Such a discrete point and click action however may provide an incomplete or lacking user experience, because discrete point and click actions may be insufficient to enable a user to experience more sophisticated interactions with the interface 152. To remedy this, it is contemplated that the ICS module 116 together with the screen 118 may enable a user to implement or simulate a touch or multi-touch input using the pointing device 114. However, as mentioned above, it is contemplated that the pointing device 114 in the example implementation itself does derive or determine an intended multi-touch input.

Figure 2:
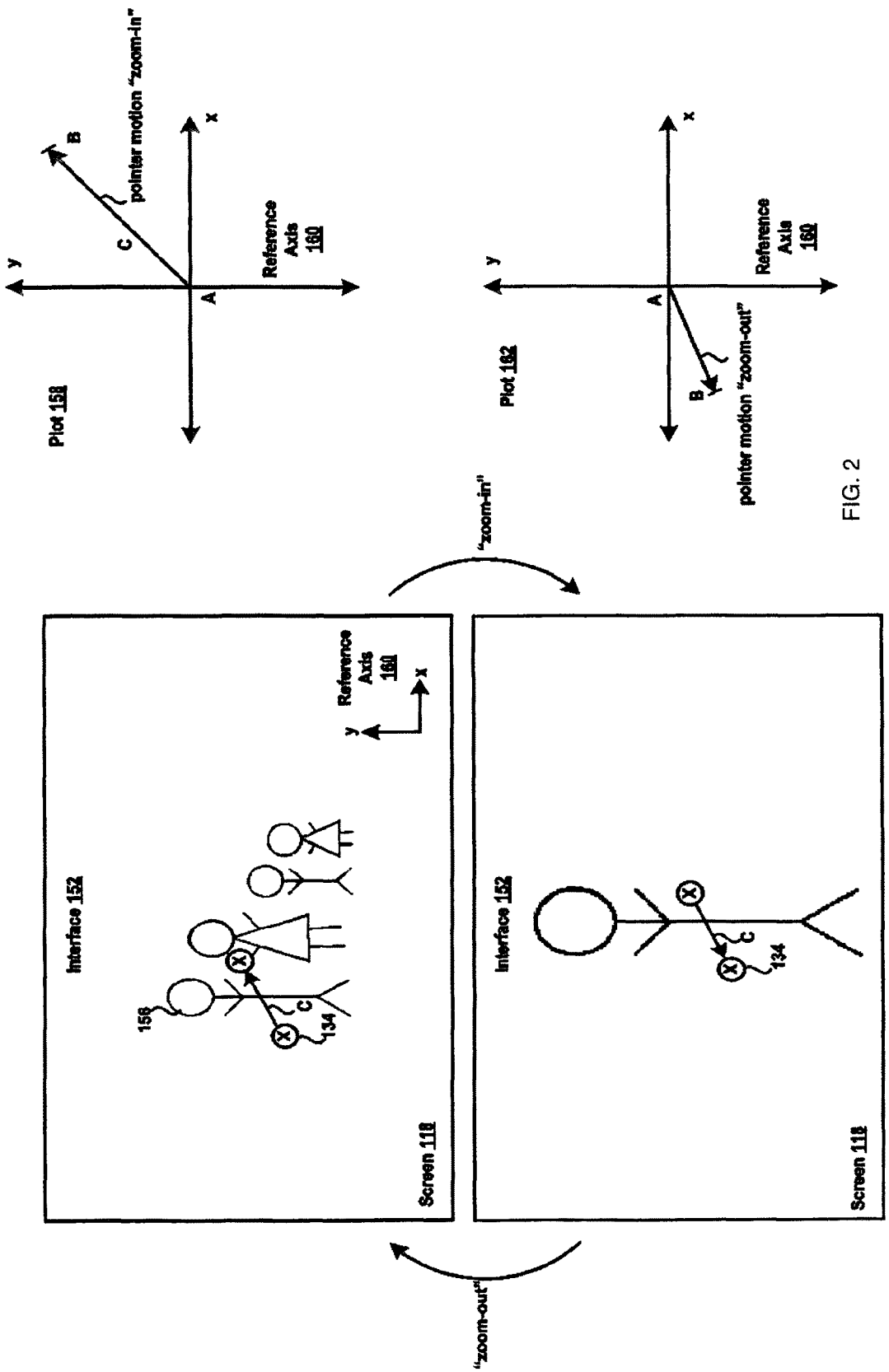
FIG. 2 shows an example gesture-based input control.

Referring now additionally to FIG. 2, a simulated multi-touch input is shown in accordance with the present disclosure. In particular, FIG. 2 shows a simulated multi-touch pinch-to-zoom operation from the perspective of movement of the element 134 within the interface 152 of FIG. 1. Such an implementation is consistent with a "simulated" input response mode in accordance with the present disclosure, and is distinguished from a single-point input response mode in many respects. For example, the simulated input response mode may enable a user to implement a touch or multi-touch input using the pointing device 114, without the requirement of the television 112 having a touch-sensitive surface. The user may thus experience a more convenient, sophisticated, complete, and/or satisfying interaction with the interface 152.

For example, a simulated multi-touch pinch-to-zoom input may be considered more fluid and/or more sophisticated when compared to a zoom function implemented by discrete point and click actions. For example, in order to zoom-in to the area 154 within the interface 152 as shown via discrete point and click actions, a user may be required to perform multiple click actions, interspersed with multiple drag actions to perfect a zoom-in to an intended feature. In contrast, and as described in further detail below, in order to zoom-in to the area 154 within the interface 152 via a simulated pinch-to zoom-in input or operation, a user more may perform a single click action to engage or activate the simulated multi-touch input, and then perform a fluid or continuous movement with the pointing device 114 to perfect a zoom-in to an intended feature. Such an implementation may at least be perceived to be a less time consuming, and a more user-friendly and satisfying experience in interacting with the interface 152. Other benefits and/or advantages associated with the simulation of a touch or multi-touch input using the pointing device 114 of FIG. 1 may be understood from the following description provided in connection with FIGS. 2-12.

For example, referring now specifically to FIG. 2, a user may initially manipulate the element 134 as shown impinging on the screen 118 using the pointing device 114 to identify or locate an area (i.e., area 154) within the interface 152 of-interest to perfect a zoom-in operation or task. For example, as a first step, a user may manipulate the element 134 using the pointing device 114 to roughly identify or locate a point within the interface 152 near an image of an individual 156. Subsequently, to initiate a zoom-in operation, the user may actuate the third control 124 of the pointing device 114 (see FIG. 1) to activate the ICS module 116 of the television receiver 110 to recognize the intention of the user to perform that input. In this example, the third control 124, as well as the first control 120 and the second control 122, may comprise of a depressible button incorporated within or on the pointing device 114. Other examples are however possible. For example, it is contemplated that the first control 120, second control 122, and third control 124, may be configured to support any type of HMI (Human-Machine Interaction) to engage the ICS module 116 of the television receiver 110. One example of such an implementation may include VIC (Voice Input Control).

Continuing with the present zoom-in operation example, following initial actuation of the third control 124, the user may move the element 134 using the pointing device 114 across the interface 152 in a predetermined and configurable manner to perfect the zoom-in operation. For example, as shown by a first plot 158 in FIG. 2, motion of the element 134 with respect to a 2-dimensional reference axis 160 of the screen 118 is generally towards an upper right portion of the interface 152, starting roughly from an initial position, or origin as shown in the first plot 158, that is lower left of the individual 156. In this example, the first plot 158 illustrates a variable A that indicates initial actuation of the third control 124 of the pointing device 114 to activate the ICS module 116, and a variable B that indicates secondary actuation of the third control 124 to deactivate the ICS module 116, corresponding to termination of the zoom-in operation. In this manner, the ICS module 116 may simulate or emulate a multi-touch pinch-to zoom-in operation based on movement of the element 134 across the screen 118. In general, a zoom factor or a magnitude of the zoom-in, may be proportional to a distance represented by a variable C within the interface 152 and on the first plot 158. This distance may correlate to a distance that is traveled by the element 134 between the initial and the secondary actuation of the third control 124.

A similar process may be performed in a simulated multi-touch zoom-out operation in accordance with the present disclosure. For example, as shown by a second plot 162 in FIG. 2, and following initial actuation of the third control 124 of the pointing device 114, the user may move the element 134 across the interface 152 to a lower left portion within the interface 152 to perfect the simulated zoom-out operation, starting roughly from an initial position that is upper right of the individual 156. In general, motion of the element 134 with respect to the reference axis 160 to the lower left portion, or to the upper right portion described above, within the interface 152 does not have to be precise. For example, motion of the element 134 with respect to the reference axis 160 to the lower left portion within the interface 152 does not have to be at a predetermined angle with respect to one or more axes of the reference axis 160. Rather, the zoom-out may be realized by general movement of the element 134 with respect to the reference axis 160 to the lower left portion within the interface 152, which is approximately or about opposite of movement of the element 134 across the interface 152. Other simulated touch inputs in accordance with the present disclosure may or may not follow such reciprocal or opposite movement in implementation.

Figure 3:
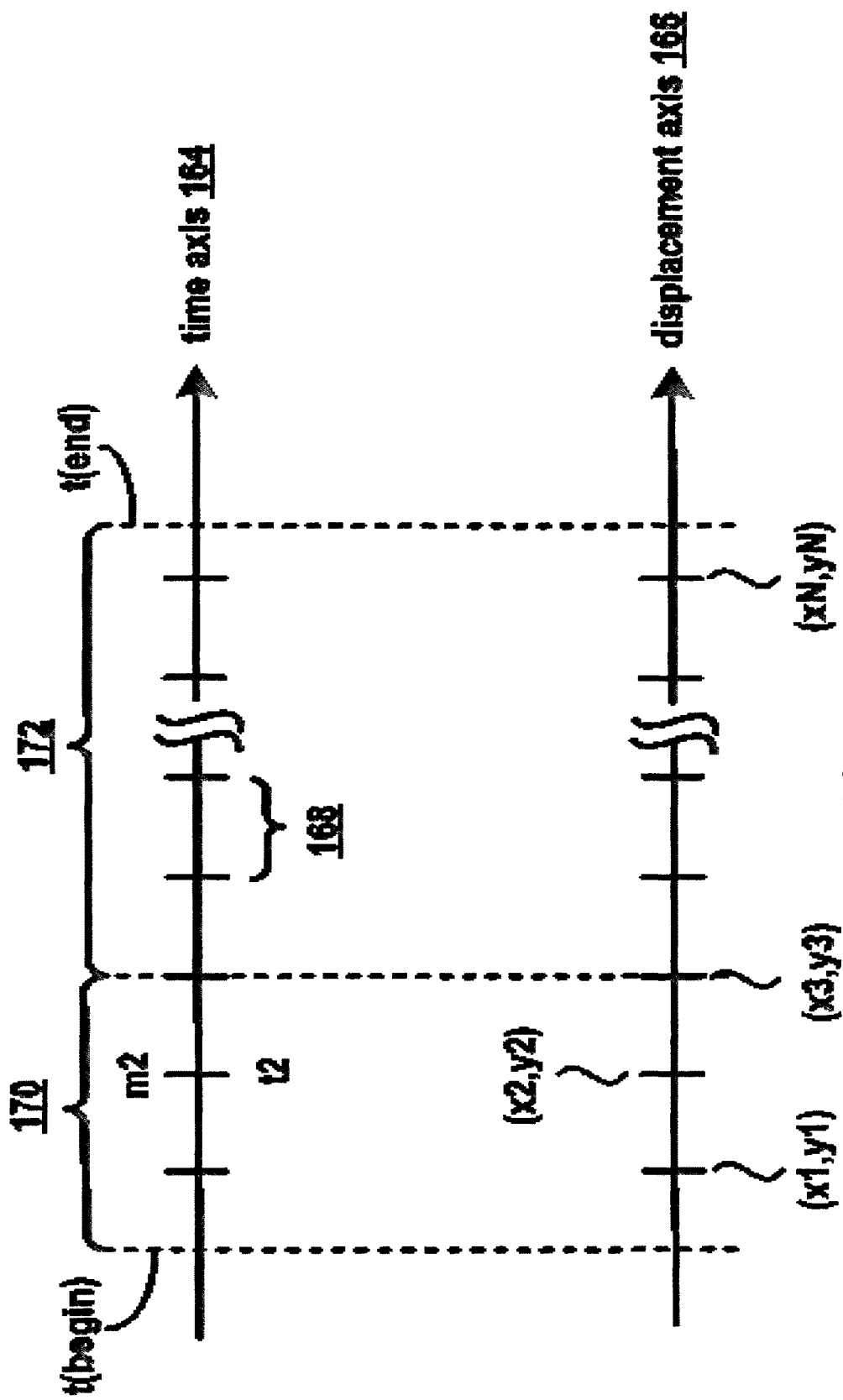
FIG. 3 shows a first example of gesture-based mapping scheme.

The first plot 158 and the second plot 162 of FIG. 2 correlate with or to motion or displacement of the element 134 across the screen 118. Referring now to FIG. 3, movement of the element 134 to implement the simulated multi-touch input of FIG. 2 is shown mapped to reference coordinate systems. In particular, FIG. 3 illustrates a time axis 164 and a displacement axis 166. In this example, initial actuation of the third control 124 of the pointing device 114 to activate the ICS module 116 may correspond to a time t(begin) marked on the time axis 164, and a secondary actuation of the third control 124 of the pointing device 114 to deactivate the ICS module 116 may correspond to a time t(end) marked on the time axis 164.

At a periodic interval 168 along the time axis 164 between time t(begin) and time t(end), the television 112 may be configured to transmit an event message to the ICS module 116 of the television receiver 110. In one example, the periodic interval 168 may correspond to about 10 (ten) microseconds. However, other examples are possible, and a duration of the periodic interval 168 may or may not be implementation-specific. In this example, each respective event message (e.g., event message m2), corresponding to a particular "tick" on the time axis 164, may include displacement information of the element 134 as measured with respect to the reference axis 160 by the television 112, along with an indication of a time corresponding to the displacement information. For example, an event message transmitted at a time t2 on the time axis 164 may at least include the information [x2, y2, t2], where the component x2 may correspond to a relative position of the element 134 along the x-axis of the reference axis 160 at time t2, and the component y2 may correspond to a relative position of the element 134 along the y-axis of the reference axis 160 at time t2.

Continuing with the present zoom-in/out operation example, the ICS module 116 may be configured to implement and control the zoom-in operation based on information contained with event messages as received from the television 112 between time t(begin) and time t(end). For example, the ICS module 116 may be configured to identify, based on received event messages, displacement of the element 134 from a first relative spatial position at time t(begin) to a second relative spatial position at time t(end). In this example, the second relative spatial position may generally exhibit "x" and "y" components greater or more positive in magnitude than "x" and "y" components of the first relative spatial position, i.e., increasing first quadrant values. This may, for example, be correlated to a user moving the pointing device 114 from an initial "lower left" orientation, such as the pointing device 114 being held in the user's right hand near the left leg, to a final "upper right" orientation, such as the pointing device 114 being held in the user's right hand with the arm held out straight from the body at shoulder lever, in a diagonal movement. Such an example displacement of the pointing device 114 is demonstrated from the perspective of the element 134 shown in FIG. 2.

Similar to that mentioned above in connection with FIG. 2, a zoom factor or a magnitude of the zoom-in, may be proportional to a distance traveled by the element 134 between the first and second relative spatial position. For example, the ICS module 116 may derive relative displacement of the element 134 between the first and second relative spatial position by performing a component-by-component operation of the form: [xN, yN, tN]−[x0, y0, t0], where N is a non-zero integer value greater than 0 (zero), at least for the temporal component. In this example, the temporal component [tN-t0] may be used in combination with the displacement component [xN-x0, yN-y0] to determine a velocity or average velocity of movement between the first and second relative spatial position. In turn, this velocity may be used by the ICS module 116 to control a speed at which the zoom-in is performed during the pinch-to-zoom-in as emulated by the ICS module 116, based on the linear relationship between distance and the product of velocity and time. For example, a speed at which the zoom-in to the individual 156 in FIG. 2 is perceived by a user may be dependent on how fast the user moves pointing device 114, and thus the element 134, over the distance represented by the variable C.

As shown in FIG. 3, the time axis 164 and the displacement axis 166 may be partitioned into a first interval 170 and a second interval 172. In this example, the ICS module 116 may calculate, based on information contained within event messages as received within the first interval 170, user intention as to a "type" of touch input to emulate. For example, the ICS module 116 may calculate distance and direction traveled by the element 134 over the first interval 170 by performing a component-by-component operation of the form: [x3, y3, 13]−[x0, y0, 10]. In this example, duration or length of the first interval 170 may be configurable, and assuming both components [x3-x0] and [y3-y0] are positive or greater than 0 (zero), the ICS module 116 may determine or estimate that movement of the element 134 is approximately between or from the initial "lower left" orientation to the final "upper right" orientation as discussed above. Here, the ICS module 116 may map such a movement to the example pinch-to-zoom-in input, thus estimating or determining user intention as to a "type" of touch input to implement. Subsequently, information contained within event messages as received within the first interval 170, combined with information contained within event messages as received within the second interval 172, may be used by the ICE module 116 to control the zoom-in of the simulated pinch-to-zoom-in in a manner as described above.

Figure 4:
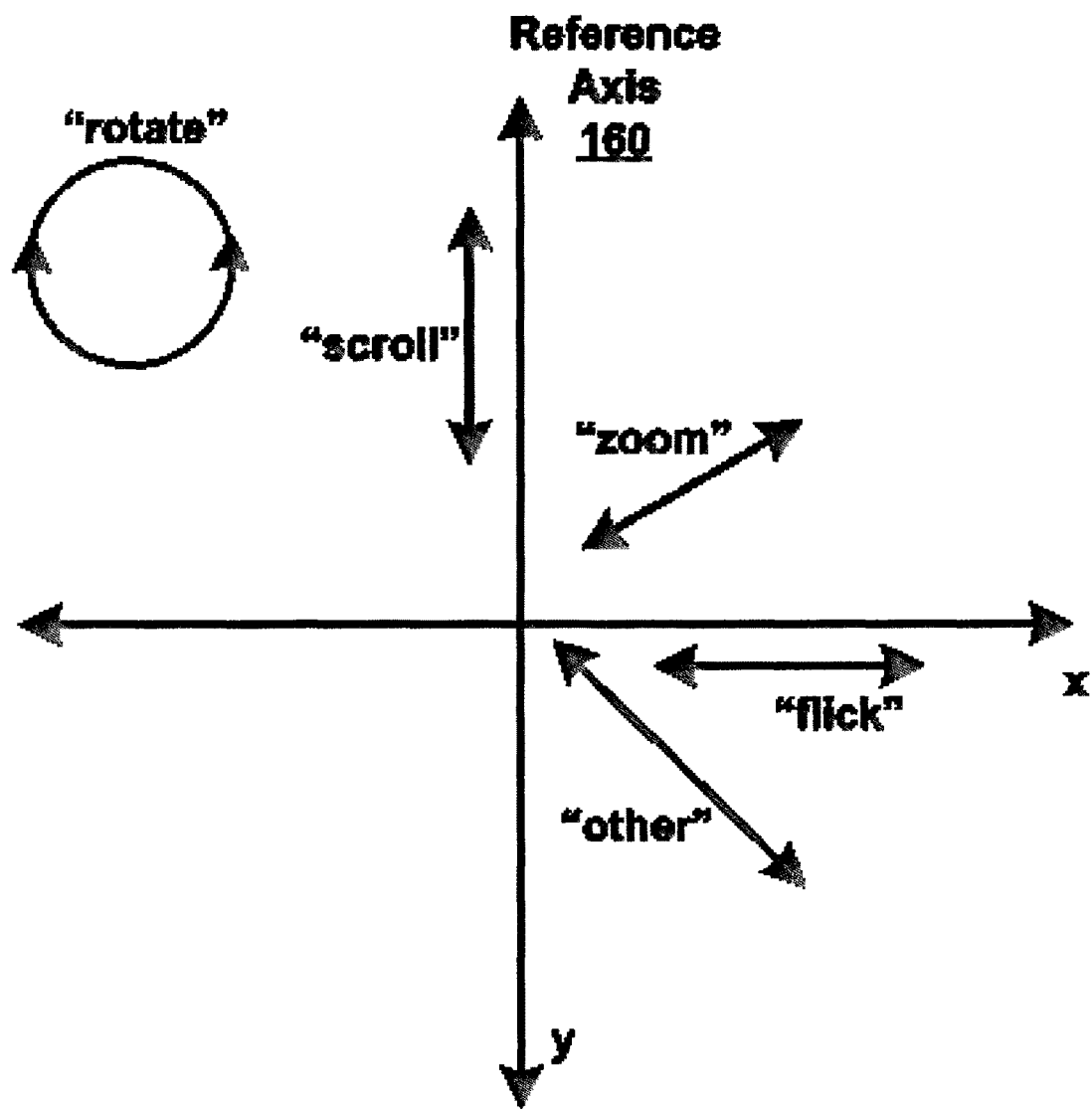
FIG. 4 shows a second example of gesture-based mapping scheme.

In general, it is contemplated that the ICS module 116 may be configured to emulate any type of touch or multi-touch input in accordance with the present disclosure. For example, referring now to FIG. 4, a mapping of multiple touch or multi-touch inputs in relation to the particular reference axis 160 of FIGS. 2-3 is shown. In the example of FIG. 4, it is contemplated that any particular simulated touch or multi-touch input may be mapped to any individual, or any particular combination, of the x-axis and y-axis of the reference axis 160. In other words, the mapping may be predetermined and configurable, and there is no requirement that maps a particular gesture to a particular movement. In this manner, these and other types of inputs may be simulated or emulated in a manner similar to that described throughout.

For example, FIG. 4 shows an example "scroll" touch input mapped to the y-axis of the reference axis 160. In this example, the ICS module 116 may be configured to identify movement of the element 134 in a vertical direction of the screen 118, and emulate a scroll operation based on information received within respective event messages during movement or displacement of the pointing device 114. This may, for example, be correlated to a user moving the pointing device 114 from an initial "up" position or orientation, such as the pointing device 114 being held in the user's right hand with the arm held out straight at right shoulder level, to a final "down" position or orientation, such as the pointing device 114 being held in the user's right hand with the arm held out at right leg level, in a vertical movement.

FIG. 4 further shows an example "flick" touch input mapped to the x-axis of the reference axis 160. In this example, the ICS module 116 may be configured to identify movement of the element 134 in a horizontal direction of the screen 118, and emulate a flick operation based on information received within respective event messages during movement or displacement of the pointing device 114. This may, for example, be correlated to a user moving the pointing device 114 from an initial "left" position or orientation, such as the pointing device 114 being held in the user's right hand with the arm held out across the body at left shoulder level, to a final "right" position or orientation, such as the pointing device 114 being held in the user's right hand with the arm held out straight from the body at right shoulder level, in a horizontal movement.

Many other types of touch inputs may be mapped to the reference axis 160 as well. For example, FIG. 4 further shows an example "other" touch input mapped to the x-axis and y-axis of the reference axis 160. In this example, the ICS module 116 may be configured to identify movement of the element 134 in a diagonal direction of the screen 118 mirror opposite of the zoom touch input, and emulate an "other" touch input based on information received within respective event messages during displacement of the pointing device 114. This may, for example, be correlated to a user moving the pointing device 114 from an initial "upper right" position or orientation, such as the pointing device 114 held in the user's right hand with the arm held out across the body at left shoulder level, to a final "lower right" position or orientation, such as the pointing device 114 being held in the user's right hand near the right leg, in a diagonal movement. The "other" touch input is intended to represent "other" types of touch inputs not expressly shown in FIG. 4. Other examples are possible.

For example, FIG. 4 further shows an example "rotate" touch input mapped to the x-axis and y-axis of the reference axis 160. In this example, the ICE module 116 may be configured to identify circular movement of the element 134 on the screen 118 and emulate a "rotate clockwise" or "rotate counter clockwise" operation based on information received within respective event messages during displacement of the pointing device 114. This may, for example, be correlated to a user moving the pointing device 114 from an initial "stationary" position or orientation, such as the pointing device 114 being held in the user's right hand with the arm held out straight from the body at right shoulder level, back to the initial "stationary" position or orientation in a "circular" movement, such as by inscribing an imaginary letter "O" in space using the pointing device 114. It will be appreciated that still may other examples are possible.

Figure 5:
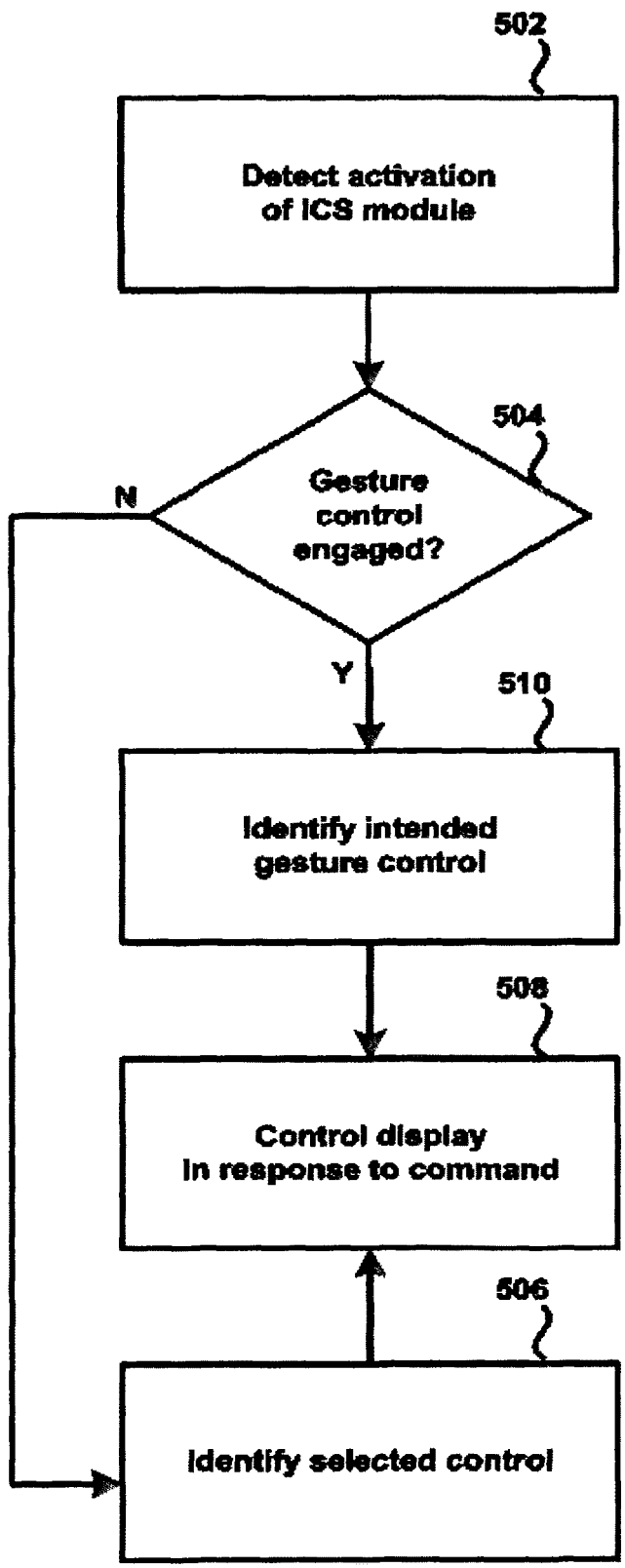
FIG. 5 shows a first example method according to the disclosure.

Referring now to FIG. 5, an example method 500 is shown in accordance with the present disclosure. The method 500 is described as implemented by or on the television receiver 110 of FIG. 1. Other embodiments are however possible. For example, one or more modules or steps of the example method 500 may be implemented by one or more of the other respective devices or components within the example system 100 of FIG. 1 as described above.

At step 502, the television receiver 110 may receive from the pointing device 114 a control signal to activate the ICS module 116. Next, at step 504, the television receiver 110 may determine whether the control signal generated by the pointing device 114 and transmitted to the television receiver 110 is in response to engagement of the second control 122 of the pointing device 114 (see FIG. 1), to activate the ICS module 116 to respond to selection a particular control within the EPG 128, or in response to engagement of the third control 124 to activate the ICS module 116 to respond to particular gesture input based on data received from the television 112.

When the control signal generated by the pointing device 114 and transmitted to the television receiver 110 is in response to engagement of the second control 122 of the pointing device 114, process flow within the example method 500 may branch to step 506. At step 506, the ICS module 116 may identify a selected control based upon coordinate data received from the television. Next, at step 508, the television receiver 110 may output to the television 112 particular data that when rendered by the television 112 corresponds to a screen or display associated with the selected control. For example, if the selected control corresponds to control 132, as mentioned above in connection with FIG. 1, the television receiver 110 may output to the television 112 the Movie M1 for immediate display thereon.

When, however, the control signal generated by the pointing device 114 and transmitted to the television receiver 110 is in response to engagement of the third control 124 of the pointing device 114, process flow within the example method 500 may branch to step 510. At step 510, the ICS module 116 may identify an intended gesture type based upon initial movement of the element 134 across the screen 118, similar to that discussion above in connection with the first interval 170 of FIG. 4. selected control based upon coordinate data received from the television. Next, at step 508, the television receiver 110 may output to the television 112 particular data that when rendered by the television 112 corresponds to a screen or display associated with the intended gesture type. For example, if the intended gesture type corresponds to a zoom-in operation, the television receiver 110 may output to the television 112 control data so that the zoom-in operation may be perfected and visualized on the screen 118 of the television 112.

Figure 6:
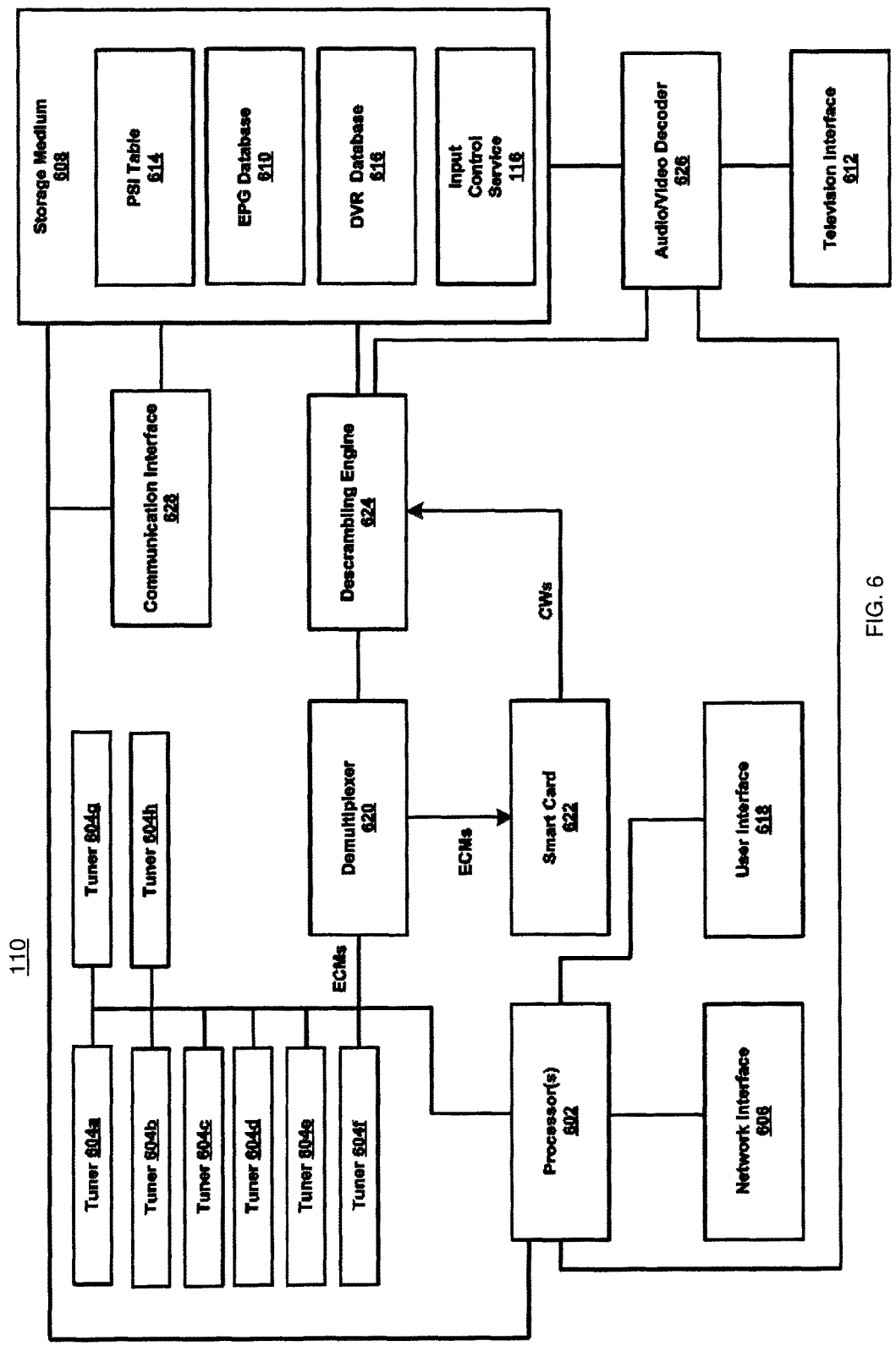
FIG. 6 shows an example block diagram of the television receiver of FIG. 1.

Referring now to FIG. 6, an example block diagram of the television receiver 110 of FIG. 1 is shown in accordance with the disclosure. The television receiver 110 may include one or more processors 602, a plurality of tuners 604*a-h*, at least one network interface 606, at least one non-transitory computer-readable storage medium 608, at least one EPG (Electronic Programming Guide) database 610, at least one television interface 612, at least one PSI (Program Specific Information) table 614, at least one DVR database 616, at least one user interface 618, at least one demultiplexer 620, at least one smart card 622, at least one descrambling engine 624, at least one decoder 626, and at least one communication interface 628. In other embodiments, fewer or greater numbers of components may be present. Further, functionality of one or more components may be combined; for example, functions of the descrambling engine 624 may be performed by the processors 602. Still further, functionality of components may be distributed among additional components, and possibly additional systems such as, for example, in a cloud-computing implementation.

The processors 602 may include one or more specialized and/or general-purpose processors configured to perform processes such as tuning to a particular channel, accessing and displaying EPG information, and/or receiving and processing input from a user. For example, the processors 602 may include one or more processors dedicated to decoding video signals from a particular format, such as according to a particular MPEG (Motion Picture Experts Group) standard, for output and display on a television, and for performing or at least facilitating decryption or descrambling.

The tuners 604a-h may be used to tune to television channels, such as television channels transmitted via satellites 606a-c. Each one of the tuners 604a-h may be capable of receiving and processing a single stream of data from a satellite transponder, or a cable RF channel, at a given time. As such, a single tuner may tune to a single transponder or, for a cable network, a single cable channel. Additionally, one tuner (e.g., tuner 604a) may be used to tune to a television channel on a first transponder stream for display using a television, while another tuner (e.g., tuner 604b) may be used to tune to a television channel on a second transponder for recording and viewing at some other time. If multiple television channels transmitted on the same transponder stream are desired, a particular tuner (e.g., tuner 604c) may be used to receive the signal containing the multiple television channels for presentation and/or recording of each of the respective multiple television channels, such as in a PTAT (Primetime Anytime) implementation for example. Although eight tuners are shown, the television receiver 110 may include more or fewer tuners (e.g., three tuners, sixteen tuners, etc.), and the features of the disclosure may be implemented similarly and scale according to the number of tuners of the television receiver 110.

The network interface 606 may be used to communicate via alternate communication channel(s) with a service provider. For example, the primary communication channel between the service provider 202 of FIG. 1 and the television receiver 110 may be via satellites 606a-c, which may be unidirectional to the television receiver 110, and an another communication channel between the service provider 202 and the television receiver 110, which may be bidirectional, may be via the network 126. In general, various types of information may be transmitted and/or received via the network interface 606.

The storage medium 608 may represent a non-transitory computer-readable storage medium. The storage medium 608 may include memory and/or a hard drive. The storage medium 608 may be used to store information received from one or more satellites and/or information received via the network interface 606. For example, the storage medium 608 may store information related to the EPG database 610, the PSI table 614, and/or the DVR database 616, among other elements or features, such as the ICS module 116 mentioned above. Recorded television programs may be stored using the storage medium 608.

The EPG database 610 may store information related to television channels and the timing of programs appearing on such television channels. Information from the EPG database 610 may be used to inform users of what television channels or programs are available, popular and/or provide recommendations. Information from the EPG database 610 may be used to generate a visual interface displayed by a television that allows a user to browse and select television channels and/or television programs for viewing and/or recording. Information used to populate the EPG database 610 may be received via the network interface 606 and/or via satellites 206a-c of FIG. 1. For example, updates to the EPG database 610 may be received periodically or at least intermittently via satellite. The EPG database 610 may serve as an interface for a user to control DVR functions of the television receiver 110, and/or to enable viewing and/or recording of multiple television channels simultaneously.

The decoder 626 may convert encoded video and audio into a format suitable for output to a display device. For instance, the decoder 626 may receive MPEG video and audio from the storage medium 608, or the descrambling engine 624, to be output to a television. MPEG video and audio from the storage medium 608 may have been recorded to the DVR database 616 as part of a previously-recorded television program. The decoder 626 may convert the MPEG video and audio into a format appropriate to be displayed by a television or other form of display device and audio into a format appropriate to be output from speakers, respectively. The decoder 626 may be a single hardware element capable of decoding a finite number of television channels at a given time, such as in a time-division arrangement. In the example embodiment, eight television channels may be decoded concurrently or simultaneously.

The television interface 612 output a signal to a television, or another form of display device, in a proper format for display of video and play back of audio. As such, the television interface 612 may output one or more television channels, stored television programming from the storage medium 608, such as television programs from the DVR database 616 and/or information from the EPG database 610 for example, to a television for presentation.

The PSI table 614 may store information used by the television receiver 110 to access various television channels. Information used to populate the PSI table 614 may be received via satellite, or cable, through the tuners 604a-h and/or may be received via the network interface 606 over the network 126 from the service provider 202 shown in FIG. 1. Information present in the PSI table 614 may be periodically or at least intermittently updated. Information that may be present in the PSI table 614 may include: television channel numbers, satellite identifiers, frequency identifiers, transponder identifiers, ECM PIDs (Entitlement Control Message, Packet Identifier), one or more audio PIDs, and video PIDs. A second audio PID of a channel may correspond to a second audio program, such as in another language. In some embodiments, the PSI table 614 may be divided into a number of tables, such as a NIT (Network Information Table), a PAT (Program Association Table), and a PMT (Program Management Table).

Table 1 below provides a simplified example of the PSI table 614 for several television channels. It should be understood that in other embodiments, many more television channels may be represented in the PSI table 614. The PSI table 614 may be periodically or at least intermittently. As such, television channels may be reassigned to different satellites and/or transponders, and the television receiver 110 may be able to handle this reassignment as long as the PSI table 614 is updated.

TABLE 1

| Channel | Satellite | Transponder | ECM PID | Audio PIDs | Video PID |
|---|---|---|---|---|---|
| 4 | 1 | 2 | 27 | 2001 | 1011 |
| 5 | 2 | 11 | 29 | 2002 | 1012 |
| 7 | 2 | 3 | 31 | 2003 | 1013 |
| 13 | 2 | 4 | 33 | 2003, 2004 | 1013 |

It should be understood that the values provided in Table 1 are for example purposes only. Actual values, including how satellites and transponders are identified, may vary. Additional information may also be stored in the PSI table 614. Video and/or audio for different television channels on different transponders may have the same PIDs. Such television channels may be differentiated based on which satellite and/or transponder to which a tuner is tuned.

DVR functionality of the television receiver 110 may permit a television channel to be recorded for a period of time. The DVR database 616 may store timers that are used by the processors 602 to determine when a television channel should be tuned to and recorded to the DVR database 616 of storage medium 608. In some embodiments, a limited amount of space of the storage medium 608 may be devoted to the DVR database 616. Timers may be set by the service provider 202 and/or one or more users of the television receiver 110. DVR functionality of the television receiver 110 may be configured by a user to record particular television programs. The PSI table 614 may be used by the television receiver 110 to determine the satellite, transponder, ECM PID, audio PID, and video PID.

The user interface 618 may include a remote control, physically separate from television receiver 110, and/or one or more buttons on the television receiver 110 that allows a user to interact with the television receiver 110. The user interface 618 may be used to select a television channel for viewing, view information from the EPG database 610, and/or program a timer stored to the DVR database 616 wherein the timer may be used to control the DVR functionality of the television receiver 110.

Referring back to the tuners 604a-h, television channels received via satellite may contain at least some encrypted or scrambled data. Packets of audio and video may be scrambled to prevent unauthorized users, such as nonsubscribers, from receiving television programming without paying the service provider 202. When one of the tuners 604a-h is receiving data from a particular transponder of a satellite, the transponder stream may be a series of data packets corresponding to multiple television channels. Each data packet may contain a PID, which in combination with the PSI table 614, can be determined to be associated with a particular television channel. Particular data packets, referred to as ECMs may be periodically transmitted. ECMs may be encrypted; the television receiver 110 may use the smart card 622 to decrypt ECMs.

The smart card 622 may function as the CA (Controlled Access) which performs decryption of encryption data to obtain control words that are used to descramble video and/or audio of television channels. Decryption of an ECM may only be possible when the user (e.g., an individual who is associated with the television receiver 110) has authorization to access the particular television channel associated with the ECM. When an ECM is received by the demultiplexer 620 and the ECM is determined to correspond to a television channel being stored and/or displayed, the ECM may be provided to the smart card 622 for decryption.

When the smart card 622 receives an encrypted ECM from the demultiplexer 620, the smart card 622 may decrypt the ECM to obtain some number of control words. In some embodiments, from each ECM received by the smart card 622, two control words are obtained. In some embodiments, when the smart card 622 receives an ECM, it compares the ECM to the previously received ECM. If the two ECMs match, the second ECM is not decrypted because the same control words would be obtained. In other embodiments, each ECM received by the smart card 622 is decrypted; however, if a second ECM matches a first ECM, the outputted control words will match; thus, effectively, the second ECM does not affect the control words output by the smart card 622. When an ECM is received by the smart card 622, it may take a period of time for the ECM to be decrypted to obtain the control words. As such, a period of time, such as about 0.2-0.5 seconds, may elapse before the control words indicated by the ECM can be obtained. The smart card 622 may be permanently part of the television receiver 110 or may be configured to be inserted and removed from the television receiver 110.

The demultiplexer 620 may be configured to filter data packets based on PIDs. For example, if a transponder data stream includes multiple television channels, data packets corresponding to a television channel that are not desired to be stored or displayed by the user may be ignored by the demultiplexer 620. As such, only data packets corresponding to the one or more television channels desired to be stored and/or displayed may be passed to either the descrambling engine 624 or the smart card 622; other data packets may be ignored. For each channel, a stream of video packets, a stream of audio packets and/or a stream of ECM packets may be present, each stream identified by a PID. In some embodiments, a common ECM stream may be used for multiple television channels. Additional data packets corresponding to other information, such as updates to the PSI table 614, may be appropriately routed by the demultiplexer 620.

The descrambling engine 624 may use the control words output by the smart card 622 in order to descramble video and/or audio corresponding to television channels for storage and/or presentation. Video and/or audio data contained in the transponder data stream received by the tuners 604a-h may be scrambled. The video and/or audio may be descrambled by the descrambling engine 624 using a particular control word. Which control word output by the smart card 622 to be used for successful descrambling may be indicated by a scramble control identifier present within the data packet containing the scrambled video or audio. Descrambled video and/or audio may be output by the descrambling engine 624 to the storage medium 608 for storage, such as part of the DVR database 616 for example, and/or to the decoder 626 for output to a television or other presentation equipment via the television interface 612.

The communication interface 628 may be used by the television receiver 110 to establish a communication link or connection between the television receiver 110 and the pointing device 114 and television 112 as shown in FIG. 1. It is contemplated that the communication interface 628 may take or exhibit any form as desired, and may be configured in a manner so as to be compatible with a like component or element incorporated within or to the pointing device 114 and television 112, and further may be defined such that the communication link may be wired and/or or wireless. Example technologies consistent with the principles or aspects of the present disclosure may include, but are not limited to, Infrared, Bluetooth®, WiFi, NFC (Near Field Communication), and/or any other communication device or subsystem similar to that discussed below in connection with FIG. 12.

For brevity, the television receiver 110 is depicted in a simplified form, and may generally include more or fewer elements or components as desired, including those configured and/or arranged for implementing various features for controlling, based upon one or more pre-determined and user-configurable criterion, the loudness or intensity of audio as output by a particular computing device. For example, the television receiver 110 is shown in FIG. 6 to include the ICS module 116 as mentioned above. Further, some routing between the various modules of the television receiver 110 has been illustrated. Such illustrations are for exemplary purposes only. The state of two modules not being directly or indirectly connected does not indicate the modules cannot communicate. Rather, connections between modules of the television receiver 110 are intended only to indicate possible common data routing. It should be understood that the modules of the television receiver 110 may be combined into a fewer number of modules or divided into a greater number of modules.

Additionally, although not explicitly shown in FIG. 6, the television receiver 110 may include one or more logical modules configured to implement a television steaming media functionality that encodes video into a particular format for transmission over the Internet such as to allow users to remotely view and control a home cable, satellite, or personal video recorder system from an Internet-enabled computer with a broadband Internet connection. The Slingbox® by Sling Media, Inc. of Foster City, Calif., is one example of a product that implements such functionality. Further, the television receiver 110 may be configured to include any number of other various components or logical modules that are implemented in hardware, software, firmware, or any combination thereof, and such components or logical modules may or may not be implementation-specific.

Figure 7:
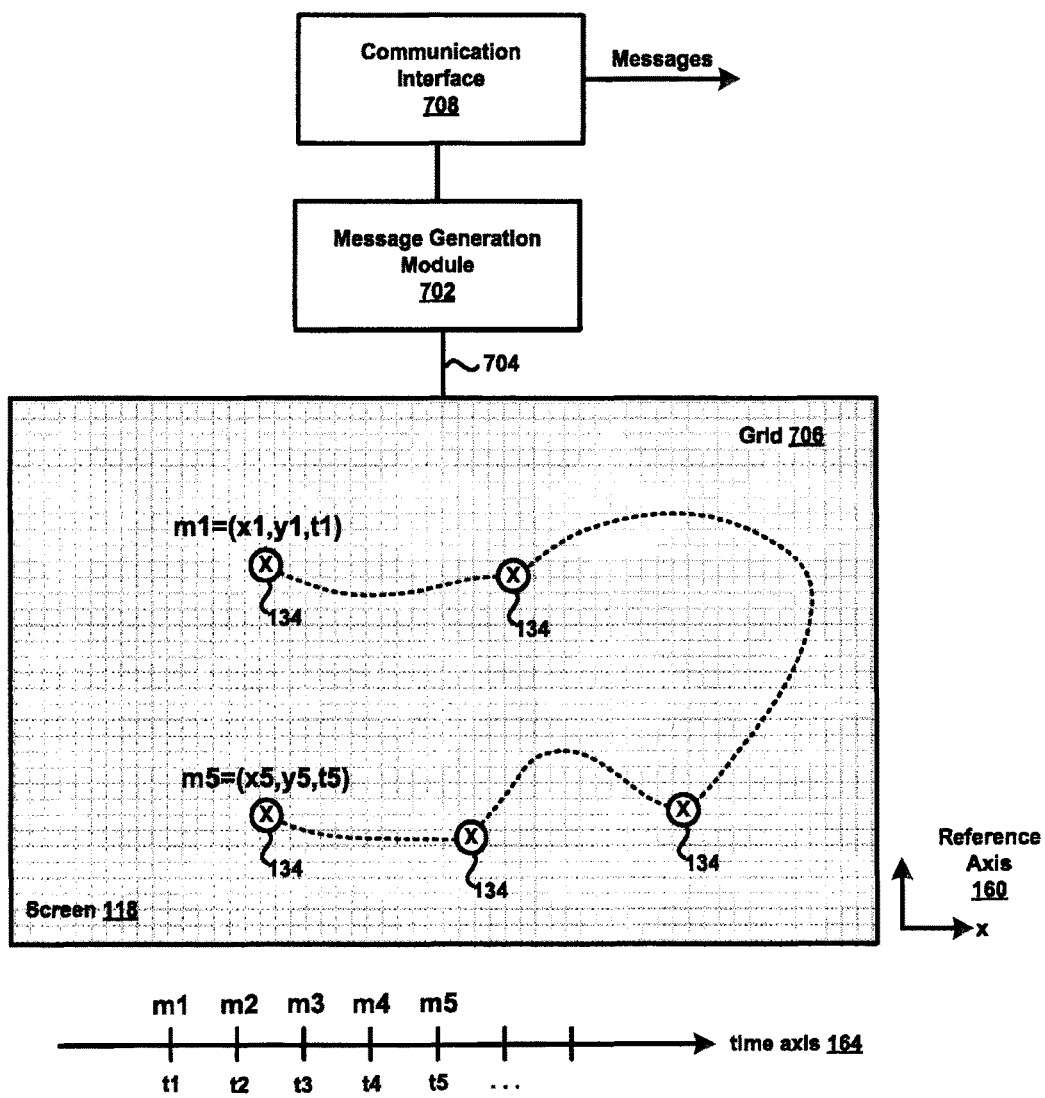
FIG. 7 shows an example block diagram of the television of FIG. 1.

Referring now to FIG. 7, an example block diagram of the television 112 of FIG. 1 is shown in accordance with the disclosure. In particular, FIG. 7 illustrates an example movement of the element 134 across the screen cover 118 of the television 112. It is contemplated that the screen cover 118 itself may serve as a laser detector, and may also comprise of an anti-reflective transparent film or coating. In practice, a message generation module 702 of the television 112 is coupled to the screen cover 118, and at periodic intervals may sample a signal 704 to derive an x-y-time triplet, the x-y pair being quantified based upon a sensed or detected (e.g., capacitive, resistive, etc.) position of the element 134 with reference to a grid 706 associated with the screen cover 118. Based upon the sampled signal, the message generation module 702 may pass messages (e.g., m1, m2, etc., as shown in FIG. 7) that comprise of a corresponding x-y-time triplet to a communication interface 708 of the television 112 for subsequent transmission to a corresponding element (e.g., communication interface 628) of the television receiver 110 for further processing.

Figure 8:
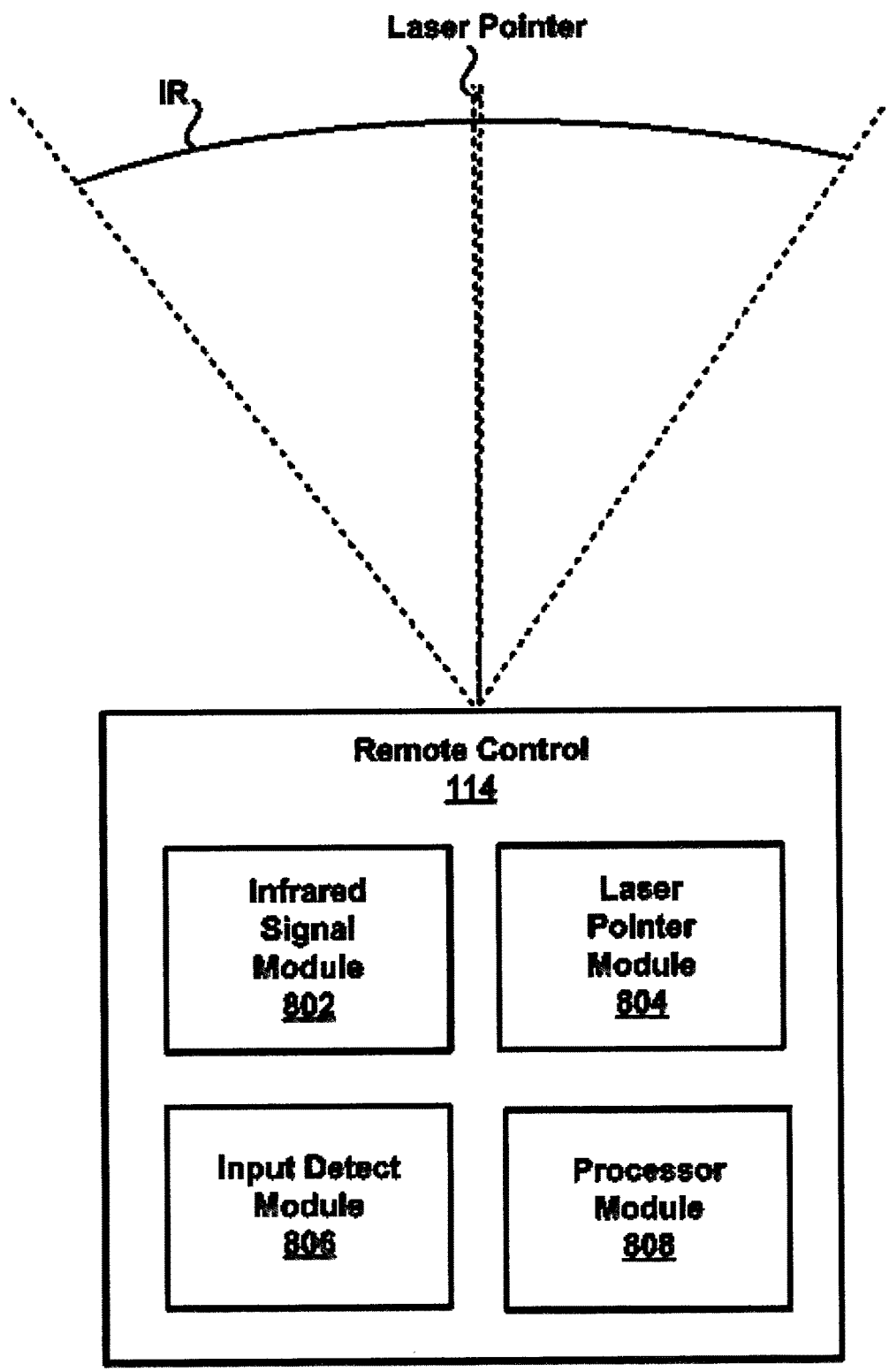
FIG. 8 shows an example block diagram of the pointing device of FIG. 1.

Referring now to FIG. 8, an example block diagram of the pointing device 114 of FIG. 1 is shown in accordance with the disclosure. In particular, FIG. 8 illustrates a number of modules of the pointing device 114 including an infrared signal module 802, a laser pointer module 804, an input detect module 806, and a processor module 808. In practice, the input detect module 806 may be configured and/or arranged to detect and discern between selection of the first control 120, second control 122, and third control 124 of the pointing device 114 (see FIG. 1). The input detect module 806 may pass information regarding such particular control selection to the processor module 808. Here, it is contemplated that the processor module 808 may either encode a command signal in accordance with a particular selected control (e.g., second control 122 or third control 124) and then pass the encoded command signal to the infrared signal module 802 for transmission of the infrared command signal 136 (see FIG. 1), or command the laser pointer module 804 to activate the laser 130.

Figure 9:
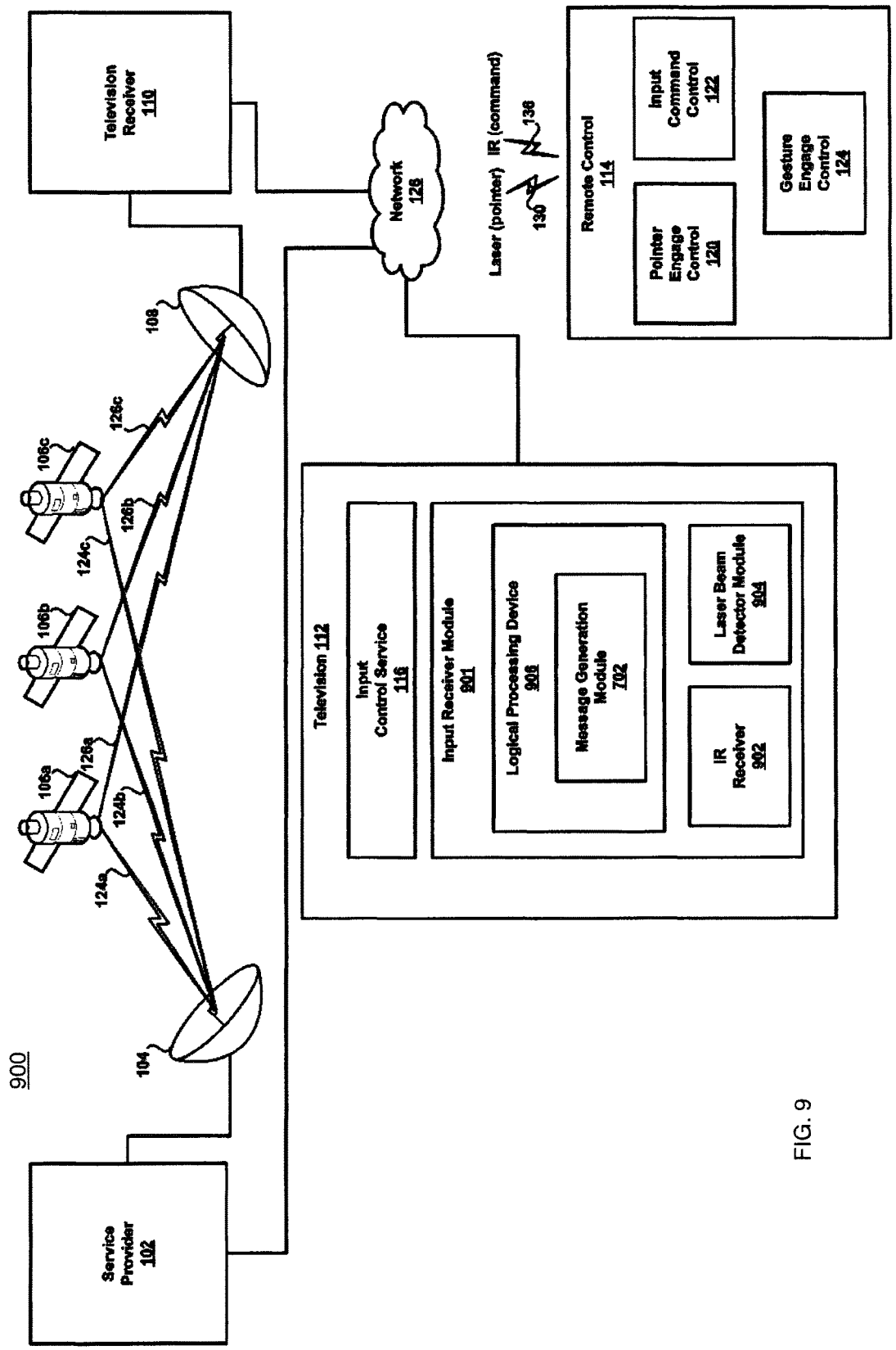
FIG. 9 shows a second example content distribution system.

Referring now to FIG. 9, a second example satellite television distribution system 900 is shown in which aspects of the present disclosure may be implemented. The example system 900 is similar to the example system 100 of FIG. 1 in many respects. In the present example though, the television 112 is configured and/or arranged to exhibit one or more features or functionality implemented by the television receiver 110 as discussed above. In other words, it is contemplated that the television receiver 110 may be built-in to the television 112 so that the television 112 may exhibit at least one of those features or elements discussed above in connection with FIG. 6, along with an instance of the ICS module 116. Advantageously, the feedback channel between the television receiver 110 and the television 112 as discussed above is omitted. Furthermore, although the remote control 114 is shown to include elements 120, 122, 124, and that the same may include or comprise one or a combination of hardware, firmware, and software, it is contemplated that the remote control 114 may be even further simplified so as to exhibit a keypad, special chip for converting a command to sequential code, IR generator, and laser diode. Accordingly, the gesture engage control 124, for example, may be omitted in such an implementation. Advantageously, the pointing device 114 itself may not necessarily require additional parts or hardware, software, firmware, etc., so that the pointing device 114 in such an implementation may be less expensive and/or easier to manufacture in comparison to other implementations. Still other benefits and/or advantages are possible as well.

In FIG. 9, however, an IRM (Input Receiver Module) module 901 is incorporated into the television 112. The IRM module 901 is shown separately from the ICS module 116, however, in other examples, the IRM module 901 may be wholly or at least partially be incorporated into the ICS module 116. In the present example, the IRM module 901 includes an IR receiver 902, laser beam detection module 904, and a logical processing device 906. The logical processing device 906 is shown to include or exhibit an instance of the message generation module 702 discussed above in connection with FIG. 7. It is contemplated that signals generated by the logical processing device 906 may be passed on to a main processor (e.g., processor 602) of the television 112. It is further contemplated that any of the elements of the television 112 and/or remote control 114 shown in FIG. 9 may include or comprise any one or combination of hardware, software, firmware.

In practice, the IR receiver 902 receives IR commands (e.g., signal 136) from the pointing device 114. The laser beam detector 904 processes signals received from the screen or screen cover 118 of the television 112 that as discussed above serves as a sensor, such as a laser sensitivity sensor that comprises an anti-reflective transparent film or coating on the surface of a screen of the television 112. The laser beam detector 904 further transfers to the logical processing device 906 coordinates of a current or instant impingement of a laser beam on the screen or screen cover 118 (see FIG. 1) or a notification about absence of a current or instant impingement of a laser beam on the screen or screen cover 118. It is contemplated that the IR receiver 902, laser beam detector 904, and logical processing device 906 may implement the various features or aspects of the present disclosure as discussed throughout according to a pair of modes: "polling" or "message after event." For example, using a polling method, the logical processing device 906 may query the laser beam detector 904 once per millisecond, for example, and the laser beam detector 904 may respond. For example, in event that a laser beam is detected by the TV and/or screen surface of the same, the laser beam detector 904 may respond with coordinates of beam. Otherwise the laser beam detector 904 may respond with an "absence" message.

Figure 10:
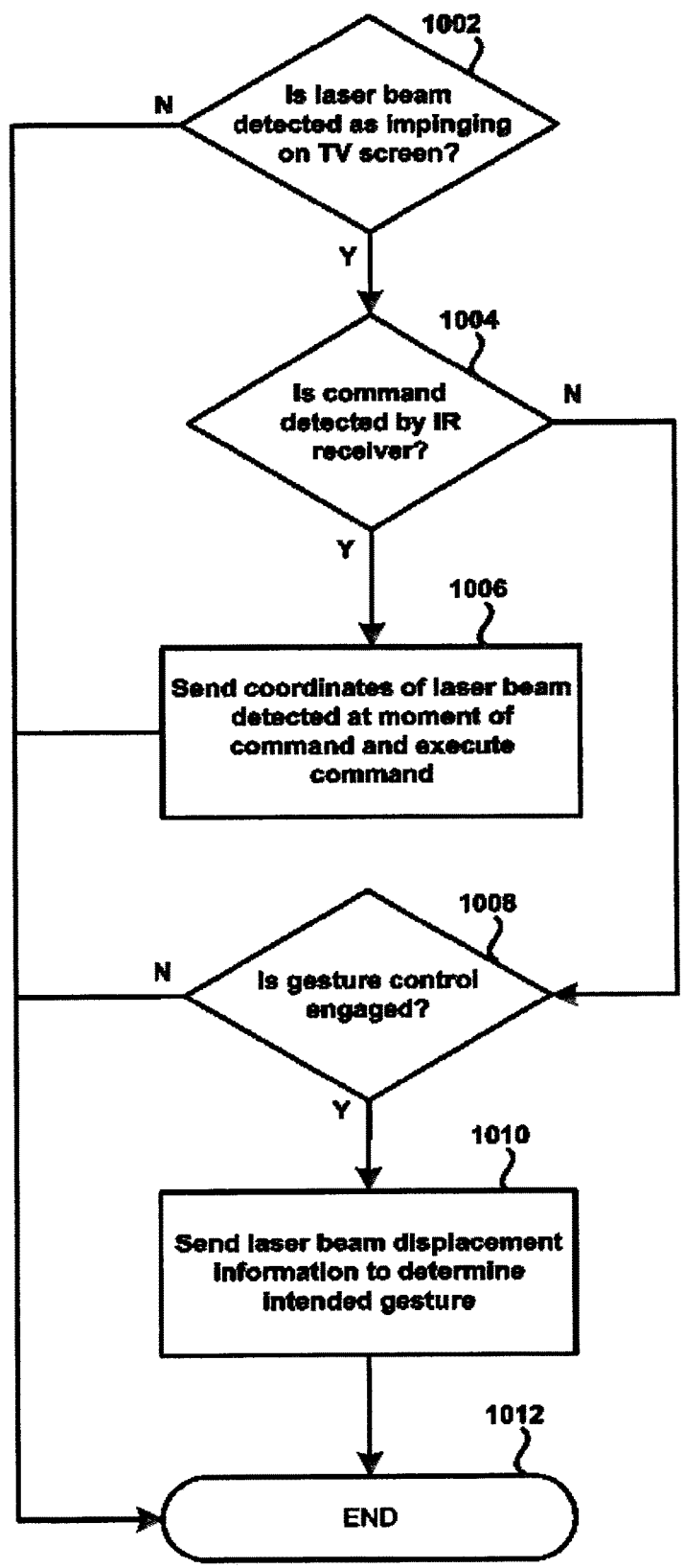
FIG. 10 shows a second example method according to the disclosure.

Referring now additionally to FIG. 10, a second example method 1000 is shown in accordance with the present disclosure. The method 1000 is described as implemented by or on the logical processing device 906 of the television 112 of FIG. 9. Other embodiments are however possible. For example, one or more modules or steps of the example method 1000 may be implemented by one or more of the other respective devices or components within the example system 100 of FIG. 1 and/or the example system of FIG. 9.

At step 1002, the laser beam detector 904 is polled or queried to determine whether or not the laser 130 is currently or instantly impinging upon the screen 118 of the television 112. If not, process flow proceeds to termination step 1012, otherwise process flow proceeds to step 1004. At step 1004, the IR receiver 902 is polled or queried to determine whether a particular command (e.g., "select") is or has been detected. If so, process flow proceeds to step 1006 whereby x-y coordinates of the laser 130 are sent to the ICS module 116, as a message for example, and the particular command is subsequently executed based upon the x-y coordinates. Process flow then proceeds to termination step 1012. If not, process flow proceeds to step 1008. At step 1008, the logical processing device 906 or the ICS module 116 may determine whether or not gesture control is enabled or activated. If not, process flow proceeds to termination step 1012. If so, process flow proceeds to step 1010. At step 1010, x-y coordinates representative of laser beam displacement across the screen 118 is/are sent to the ICS module 116, so as to determine and implement an intended gesture in a manner as discussed throughout. It is contemplated the periodicity or frequency of x-y coordinates acquired at step 1010 may be implementation-specific. For example, x-y coordinates may be acquired in millisecond increments. Other examples are possible. Process flow then proceeds to termination step 1012.

Figure 11:
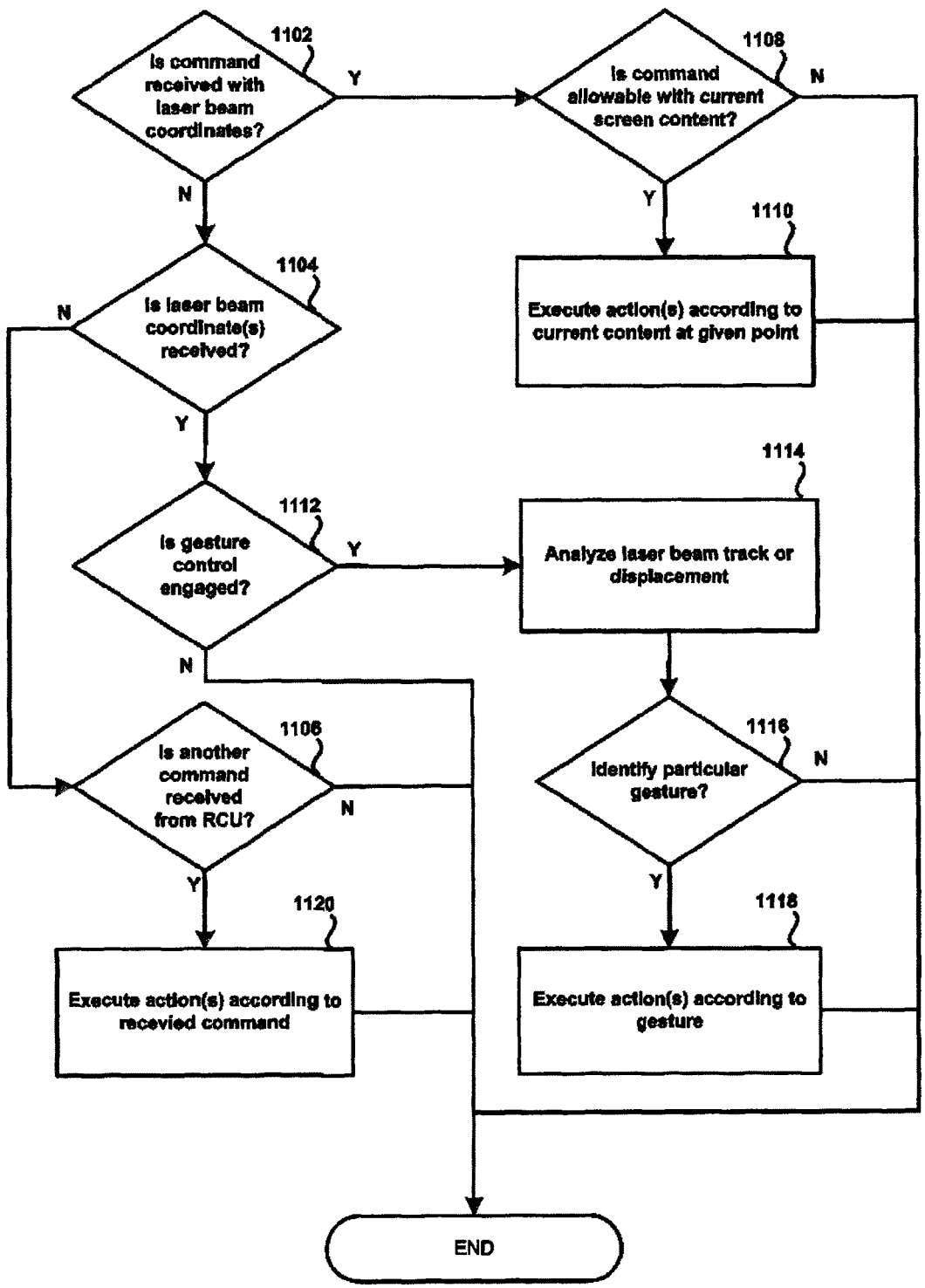
FIG. 11 shows a third example method according to the disclosure.

Referring now to FIG. 11, a third example method 1100 is shown in accordance with the present disclosure. The method 1100 is described as implemented by or on the television receiver 110 of FIG. 1. In this example though, the IRM module 901 shown in FIG. 9 may be incorporated into as part of the ICS module 116. In other examples, the television receiver 110 may include an instance of the ICS module 116, and the television 112 may include an instance of the IRM module 901. Still many other examples are possible, and it is contemplated that various features or functionality of the present disclosure may be logically grouped together as desired and/or implemented by any one or a combination of the television 112 and television receiver 110 as desired. For example, one or more modules or steps of the example method 1100 may be implemented by one or more of the other respective devices or components, wholly or at least partially, within the system 100 of FIG. 1 and/or the system 900 of FIG. 9.

At steps 1102, 1104, 1106 type or kind of messages received from the IRM module 901 is or are determined. If, at step 1102, it is determined that a particular command (e.g., "select") together with coordinates of the laser beam 318 are received, then at step 1108 current context may be analyzed for evaluation of compatibility with the particular command. For example, if currently any menu is shown on the screen 318, then a "select" command may be considered viable or relevant or possible to implement. Next, at step 1110, the particular command may be executed accordingly by appropriate hardware and/or software and/or firmware of the television 112 and/or television receiver 110 (see e.g., FIG. 6 and corresponding description). At step 1112, it may be determined if gesture control is allowable or engaged or permissible. If so, then at step 1114 displacement of the laser beam 318 may analyzed. Analysis may include at least one of: combine tracks or x-y pairs together; analysis of direction and shape of displacement; error correction or identification.

Next, at step 1116, a determination may be made as to whether or not a particular (intended) gesture is identified, and, if true, then at step 1118, the same may be executed accordingly by appropriate hardware and/or software and/or firmware of the television 112 and/or television receiver 110 (see e.g., FIG. 6 and corresponding description). Further, it is contemplated that the ICS module 116 may process typical or conventional RCU commands received via IR interface at step 1106 such as, for example, "Channel Up/Down," "Sound level Up/Down," "Mute," and etc. At step 1120, the same may be executed accordingly by appropriate hardware and/or software and/or firmware of the television 112 and/or television receiver 110 (see e.g., FIG. 6 and corresponding description). Other implementations are possible.

Figure 12:
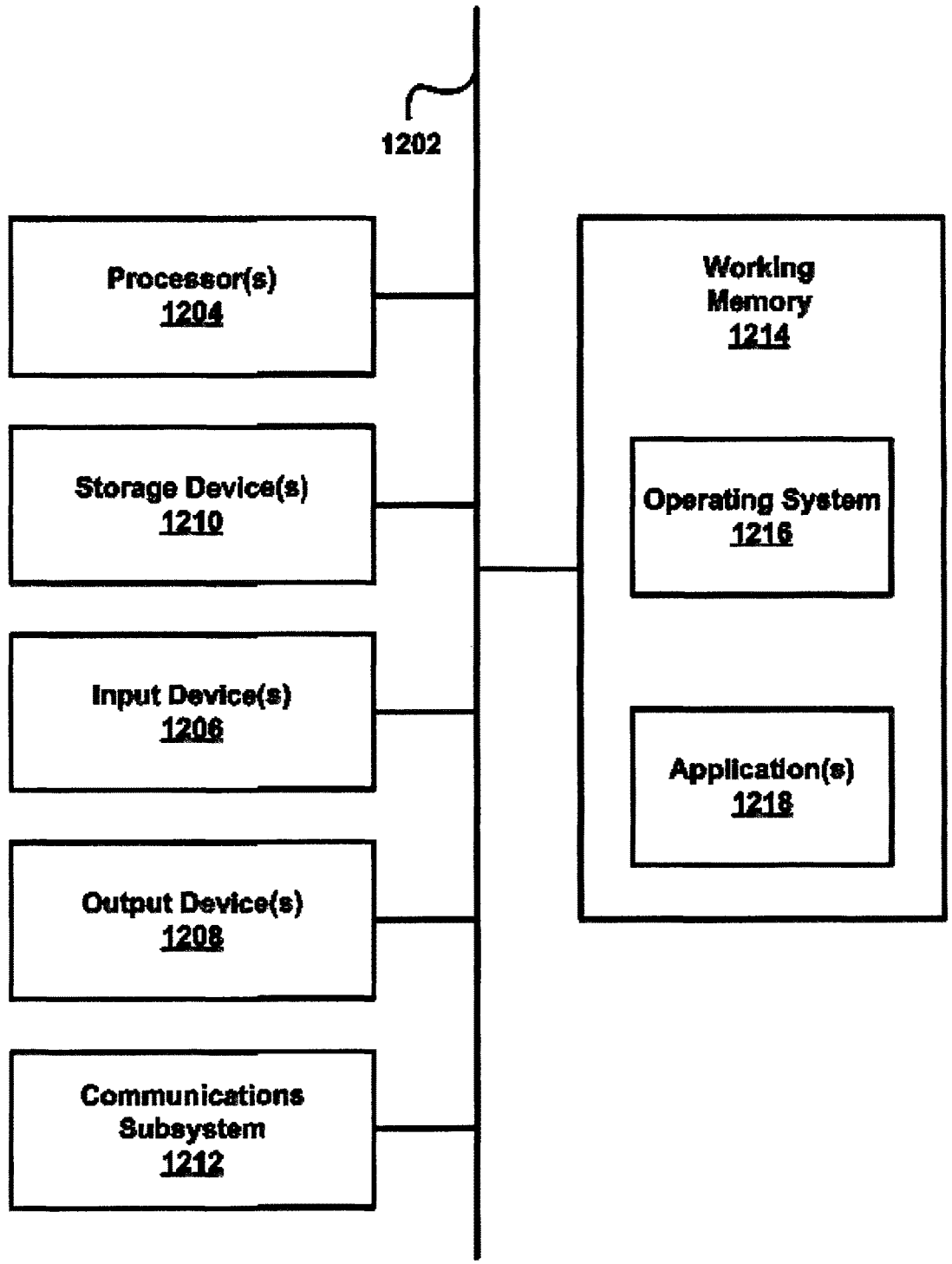
FIG. 12 shows an example computing system or device.

FIG. 12 shows an example computer system or device 1200 in accordance with the disclosure. An example of a computer system or device includes a television, enterprise server, blade server, desktop computer, laptop computer, tablet computer, personal data assistant, smartphone, gaming console, STB, television receiver, a combined laser and infrared pointing device or remote control for targeting a user interface menu element on a television screen and for simulating a multi-touch input in accordance with the present disclosure, and/or any other type of machine configured for performing calculations. Accordingly, any particular one of the previously-described computing devices may be wholly or at least partially configured to exhibit features similar to the computer system 1200, such as any of the respective elements of at least FIG. 1 and FIG. 9. For example, any of one or more of the respective elements of at least FIG. 1 and FIG. 9 may be configured and/or arranged to perform and/or include instructions that, when executed, perform the method of FIG. 5, and/or FIG. 10, and/or FIG. 11. Still further, any of one or more of the respective elements of at least FIG. 1 and FIG. 9 may be configured to perform and/or include instructions that, when executed, instantiate and implement one or more of the feature or aspects of the present disclosure.

The computer device 1200 is shown comprising hardware elements that may be electrically coupled via a bus 1202 (or may otherwise be in communication, as appropriate). The hardware elements may include a processing unit with one or more processors 1204, including without limitation one or more general-purpose processors and/or one or more special-purpose processors (such as digital signal processing chips, graphics acceleration processors, and/or the like); one or more input devices 1206, which may include without limitation a remote control, a mouse, a keyboard, and/or the like; and one or more output devices 1208, which may include without limitation a presentation device (e.g., television), a printer, and/or the like.

The computer system 1200 may further include (and/or be in communication with) one or more non-transitory storage devices 1210, which may comprise, without limitation, local and/or network accessible storage, and/or may include, without limitation, a disk drive, a drive array, an optical storage device, a solid-state storage device, such as a random access memory, and/or a read-only memory, which may be programmable, flash-updateable, and/or the like. Such storage devices may be configured to implement any appropriate data stores, including without limitation, various file systems, database structures, and/or the like.

The computer device 1200 might also include a communications subsystem 1212, which may include without limitation a modem, a network card (wireless and/or wired), an infrared communication device, a wireless communication device and/or a chipset such as a Bluetooth™ device, 1202.11 device, WiFi device, WiMax device, cellular communication facilities such as GSM (Global System for Mobile Communications), W-CDMA (Wideband Code Division Multiple Access), LTE (Long Term Evolution), etc., and/or the like. The communications subsystem 1212 may permit data to be exchanged with a network (such as the network described below, to name one example), other computer systems, and/or any other devices described herein. In many embodiments, the computer system 1200 will further comprise a working memory 1214, which may include a random access memory and/or a read-only memory device, as described above.

The computer device 1200 also may comprise software elements, shown as being currently located within the working memory 1214, including an operating system 1216, device drivers, executable libraries, and/or other code, such as one or more application programs 1218, which may comprise computer programs provided by various embodiments, and/or may be designed to implement methods, and/or configure systems, provided by other embodiments, as described herein. By way of example, one or more procedures described with respect to the method(s) discussed above, and/or system components might be implemented as code and/or instructions executable by a computer (and/or a processor within a computer); in an aspect, then, such code and/or instructions may be used to configure and/or adapt a general purpose computer (or other device) to perform one or more operations in accordance with the described methods.

A set of these instructions and/or code might be stored on a non-transitory computer-readable storage medium, such as the storage device(s) 1210 described above. In some cases, the storage medium might be incorporated within a computer system, such as computer system 1200. In other embodiments, the storage medium might be separate from a computer system (e.g., a removable medium, such as flash memory), and/or provided in an installation package, such that the storage medium may be used to program, configure, and/or adapt a general purpose computer with the instructions/code stored thereon. These instructions might take the form of executable code, which is executable by the computer device 1200 and/or might take the form of source and/or installable code, which, upon compilation and/or installation on the computer system 1200 (e.g., using any of a variety of generally available compilers, installation programs, compression/decompression utilities, etc.), then takes the form of executable code.

It will be apparent that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

As mentioned above, in one aspect, some examples may employ a computer system (such as the computer device 1200) to perform methods in accordance with various examples of the disclosure. According to a set of embodiments, some or all of the procedures of such methods are performed by the computer system 1200 in response to processor 1204 executing one or more sequences of one or more instructions (which might be incorporated into the operating system 1216 and/or other code, such as an application program 1218) contained in the working memory 1214. Such instructions may be read into the working memory 1214 from another computer-readable medium, such as one or more of the storage device(s) 1210. Merely by way of example, execution of the sequences of instructions contained in the working memory 1214 may cause the processor(s) 1204 to perform one or more procedures of the methods described herein.

The terms "machine-readable medium" and "computer-readable medium," as used herein, may refer to any non-transitory medium that participates in providing data that causes a machine to operate in a specific fashion. In an embodiment implemented using the computer device 1200, various computer-readable media might be involved in providing instructions/code to processor(s) 1204 for execution and/or might be used to store and/or carry such instructions/code. In many implementations, a computer-readable medium is a physical and/or tangible storage medium. Such a medium may take the form of a non-volatile media or volatile media. Non-volatile media may include, for example, optical and/or magnetic disks, such as the storage device(s) 1210. Volatile media may include, without limitation, dynamic memory, such as the working memory 1214.

Example forms of physical and/or tangible computer-readable media may include a floppy disk, a flexible disk, hard disk, magnetic tape, or any other magnetic medium, a compact disc, any other optical medium, ROM (Read Only Memory), RAM (Random Access Memory), and etc., any other memory chip or cartridge, or any other medium from which a computer may read instructions and/or code. Various forms of computer-readable media may be involved in carrying one or more sequences of one or more instructions to the processor(s) 1204 for execution. By way of example, the instructions may initially be carried on a magnetic disk and/or optical disc of a remote computer. A remote computer might load the instructions into its dynamic memory and send the instructions as signals over a transmission medium to be received and/or executed by the computer system 1200.

The communications subsystem 1212 (and/or components thereof) generally will receive signals, and the bus 1202 then might carry the signals (and/or the data, instructions, etc. carried by the signals) to the working memory 1214, from which the processor(s) 1204 retrieves and executes the instructions. The instructions received by the working memory 1214 may optionally be stored on a non-transitory storage device 1210 either before or after execution by the processor(s) 1204.

It should further be understood that the components of computer device 1200 can be distributed across a network. For example, some processing may be performed in one location using a first processor while other processing may be performed by another processor remote from the first processor. Other components of computer system 1200 may be similarly distributed. As such, computer device 1200 may be interpreted as a distributed computing system that performs processing in multiple locations. In some instances, computer system 1200 may be interpreted as a single computing device, such as a distinct laptop, desktop computer, or the like, depending on the context.

The methods, systems, and devices discussed above are examples. Various configurations may omit, substitute, or add various method steps or procedures, or system components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those of skill with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations may be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Furthermore, the example examples described herein may be implemented as logical operations in a computing device in a networked computing system environment. The logical operations may be implemented as: (i) a sequence of computer implemented instructions, steps, or program modules running on a computing device; and (ii) interconnected logic or hardware modules running within a computing device.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method, comprising:
receiving, by a computing device from a presentation device coupled with the computing device, an indication of impingement of a laser beam at a particular point on a screen of the presentation device, the laser beam generated by a remote control device responsive to a first user interaction with a first physical control of the remote control device;
determining, responsive to receiving the indication of impingement of the laser beam, whether the computing device has received, from the remote control device at a command time, a command to engage based upon an infrared signal generated by the remote control device responsive to a second user interaction with a second physical control of the remote control device;
detecting, responsive to determining that the computing device has not received the command to engage, a gesture in accordance with detecting a displacement of the laser beam across the presentation device; and
determining, responsive to determining that by the computing device has received the command to engage, an intent of selection of a user interface command of a plurality of user interface commands based upon detecting a location of the impingement and the command to engage.

2. The method of claim 1, further comprising:
deriving a coordinate that identifies the particular point on the screen; and
determining the intent of selection of the user interface command based upon the coordinate.

3. The method of claim 1, further comprising:
outputting the particular user interface for display by the presentation device.

4. The method of claim 3, further comprising:
detecting particular movement of the laser beam across the screen as the laser beam impinges the screen; and
controlling display of the particular user interface based on the particular movement of the laser beam across the screen.

5. The method of claim 3, further comprising:
detecting particular displacement of the laser beam across the screen as the laser beam impinges the screen; and
invoking, based on the particular displacement, an image scroll operation to control display of the particular user interface.

6. The method of claim 5, further comprising:
detecting impingement of the laser beam at a point on the screen for a predetermined time period; and
terminating the image scroll operation following lapse of a predetermined time interval subsequent the predetermined time period.

7. The method of claim 3, further comprising:
detecting particular displacement of the laser beam across the screen as the laser beam impinges the screen; and
invoking, based on the particular displacement, an image zoom operation to control display of the particular user interface.

8. The method of claim 7, further comprising:
detecting impingement of the laser beam at a point on the screen for a predetermined time period; and
terminating the image zoom operation following lapse of a predetermined time interval subsequent the predetermined time period.

9. The method of claim 1, wherein the computing device is a television receiver.

10. The method of claim 1, wherein the computing device is a television.

11. A television receiver, comprising:
a processor; and
a memory communicatively coupled with and readable by the processor and having stored processor-readable instructions that, when executed by the processor, cause the processor to:
receive, from a presentation device, an indication of impingement of a laser beam at a particular point on a screen of the presentation device, the laser beam generated by a remote control device responsive to a first user interaction with a first physical control of the remote control device;
determine, responsive to receiving the indication of impingement of the laser beam, whether a command to engage has been received from the remote control device at a command time, the command to engage based upon an infrared signal generated by the remote control device responsive to a second user interaction with a second physical control of the remote control device;

detect, responsive to determining that the command to engage has not been received, a gesture in accordance with detecting a displacement of the laser beam across the presentation device; and determine, responsive to determining that the command to engage has been received, an intent of selection of a user interface command of a plurality of user interface commands based upon detecting a location of the impingement and the command to engage.

12. The television receiver of claim 11, wherein the memory having stored processor-readable instructions which, when executed by the processor, cause the processor to:

derive a coordinate that identifies the particular point on the screen; and determine the intent of selection of the user interface command based upon the coordinate.

13. The television receiver of claim 11, wherein the memory having stored processor-readable instructions which, when executed by the processor, cause the processor to:

output the particular user interface for display by the presentation device.

14. The television receiver of claim 13, wherein the memory having stored processor-readable instructions which, when executed by the processor, cause the processor to:

receive an indication of particular movement of the laser beam across the screen as the laser beam impinges the screen; and control display of the particular user interface based on the particular movement of the laser beam across the screen.

15. The television receiver of claim 11, wherein the memory having stored processor-readable instructions which, when executed by the processor, cause the processor to:

receive an indication of particular displacement of the laser beam across the screen as the laser beam impinges the screen; and invoke, based on the particular displacement, an image scroll operation to control display of the particular user interface.

16. The television receiver of claim 11, wherein the memory having stored processor-readable instructions which, when executed by the processor, cause the processor to:

receive an indication of particular displacement of the laser beam across the screen as the laser beam impinges the screen; and invoke, based on the particular displacement, an image zoom operation to control display of the particular user interface.

17. The television receiver of claim 11, wherein the memory having stored processor-readable instructions which, when executed by the processor, cause the processor to:

receive an indication of impingement of the laser beam at a point on the screen for a predetermined time period; and terminate the image scroll operation following lapse of a predetermined time interval subsequent the predetermined time period.

18. The television receiver of claim 11, wherein the memory having stored processor-readable instructions which, when executed by the processor, cause the processor to:

receive an indication of impingement of the laser beam at a point on the screen for a predetermined time period; and terminate the image zoom operation following lapse of a predetermined time interval subsequent the predetermined time period.

19. A computer-implemented method, comprising:

receiving, by a computing device from a presentation device coupled with the computing device, an indication of impingement of a laser beam at a particular point on a screen of the presentation device, the laser beam generated by a remote control device responsive to a first user interaction with a first physical control of the remote control device;

determining, responsive to receiving the indication of impingement of the laser beam, whether the computing device has received, from the remote control device at a command time, a command to engage based upon an infrared signal generated by the remote control device responsive to a second user interaction with a second physical control of the remote control device;

detecting, responsive to determining that the computing device has not received the command to engage, a gesture in accordance with detecting a displacement of the laser beam across the presentation device; and determining, responsive to determining that the computing device has received the command to engage, an intent of selection of a user interface command of a plurality of user interface commands based upon detecting a location of the impingement and the command to engage.

20. The method of claim 19, further comprising, responsive to determining that the computing device has received the command to engage:

selecting, by the computing device, a particular user interface for display by the presentation device based upon the intent of selection of the user interface command; and outputting the particular user interface for display by the presentation device.

* * * * *